(12) United States Patent
Brown et al.

(10) Patent No.: US 10,437,679 B2
(45) Date of Patent: Oct. 8, 2019

(54) POINT-IN-TIME SNAP COPY WITHDRAWAL MANAGEMENT

(71) Applicant: INTERNATIONAL BUSINESS MACHINES CORPORATION, Armonk, NY (US)

(72) Inventors: Theresa M. Brown, Tucson, AZ (US); Nicolas M. Clayton, Warrington (GB); Joshua J. Crawford, Tucson, AZ (US); Nedlaya Y. Francisco, Tucson, AZ (US); Theodore T. Harris, Jr., Tucson, AZ (US); Gregory E. McBride, Vail, AZ (US); Carol S. Mellgren, Tucson, AZ (US); Edgar X. Somoza, Tucson, AZ (US); Damian Trujillo, Sahuarita, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 316 days.

(21) Appl. No.: 15/588,237

(22) Filed: May 5, 2017

(65) Prior Publication Data
US 2018/0321848 A1 Nov. 8, 2018

(51) Int. Cl.
*G06F 12/00* (2006.01)
*G06F 11/14* (2006.01)

(52) U.S. Cl.
CPC .............................. *G06F 11/1402* (2013.01)

(58) Field of Classification Search
CPC .. G06F 12/0866; G06F 12/0804; G06F 3/067; G06F 12/0868; G06F 3/065
See application file for complete search history.

(56) References Cited

U.S. PATENT DOCUMENTS

| | | | |
|---|---|---|---|
| 7,047,378 B2 | 5/2006 | Factor et al. | |
| 7,930,588 B2 | 4/2011 | Blount et al. | |
| 9,086,818 B2 | 7/2015 | Benhase et al. | |
| 2009/0249116 A1* | 10/2009 | Bartfai | G06F 11/2066 714/6.12 |
| 2012/0284474 A1 | 11/2012 | Lehr et al. | |
| 2012/0303898 A1* | 11/2012 | Ash | G06F 12/0871 711/119 |

* cited by examiner

*Primary Examiner* — Arvind Talukdar
(74) *Attorney, Agent, or Firm* — William K. Konrad; Konrad Raynes Davda & Victor LLP

(57) ABSTRACT

Withdrawal of a point-in-time snap copy relationship or a portion of such a relationship, is managed in a manner which can obviate disruption of consistency groups due to the withdrawal. If the withdrawal request is directed to a subrange of the original snap copy relationship, the snap copy relationship is split by creating one or more point-in-time snap copy relationships over one or more subranges of tracks of the snap copy source. A determination is made as to whether to delay execution of the withdrawal request to temporarily preserve data of the withdrawal range. Disruptions to completion of consistency groups may be avoided by selectively delaying the withdrawal of a snap copy relationship corresponding to the withdrawal subrange. In so far as the host is involved, a host may treat the withdrawal request as immediately granted without delay. Other aspects may be realized, depending upon the particular application.

21 Claims, 10 Drawing Sheets

POINT-IN-TIME SNAP COPY WITHDRAWAL MANAGEMENT

BACKGROUND OF THE INVENTION

1. Field of the Invention

The present invention relates to a computer program product, system, and method for point-in-time snap copy withdrawal management.

2. Description of the Related Art

Data storage systems, particularly at the enterprise level, are usually designed to provide a high level of redundancy to reduce the risk of data loss in the event of failure of a component of the data storage system. Thus, multiple copies of data are frequently stored on multiple systems which may be geographically dispersed. Thus, data from a host to be stored in the data storage system is typically directed to a primary system at a local site and then replicated to secondary system which may be geographically remote system from the primary system.

The process of replicating, that is, copying data over to the secondary system can be setup in either a synchronous or asynchronous relationship between the primary system and the secondary system. In a synchronous relationship, any updates to the primary system are typically synchronized with the secondary system, that is, successfully copied over to the secondary system, before the primary system reports to the host that the data storage input/output operation has been successfully completed. As a result, data storage to a primary storage system and a secondary system in a synchronous relationship may adversely affect system performance of the host while the host awaits completion of the synchronous copy operations. In storage systems in which the primary and secondary systems are widely separated, delays to completion of the synchronous copy operations may be greater, which can further adversely affect host performance. For example, in storage systems in which the primary system and the secondary system are separated by a geographical distance of 300 kilometers (Km) or more, for example, there can be a delay of 3-5 seconds (or more) before the data is successfully replicated at the secondary system.

As a result, storage systems frequently employ an asynchronous relationship between a primary system and a secondary system, particularly if the secondary system is geographically distant from the primary system. In an asynchronous relationship, successful updates to the primary system are typically reported to the host as a successful storage input/output operation without waiting for the update to be replicated to the secondary system. As a result, the host need not wait for the data replication to the secondary system to be completed, and the performance of the host system may be enhanced accordingly.

As the name suggests, in an asynchronous relationship, the primary system and the secondary system may not be fully synchronized at any one time. Thus, data stored on the secondary system typically lags that stored in the primary system. Accordingly, new data stored on a primary system may not be stored on the secondary system for an interval of time such as 3-5 seconds, for example.

In data replication systems, data is typically maintained in volume pairs, comprising a primary volume in a primary storage device and a corresponding secondary volume in a secondary storage device that includes an identical copy of the data maintained in the primary volume. The primary and secondary volumes are identified by a copy relationship in which the data of the primary volume, also referred to as the source volume, is copied to the secondary volume, also referred to as the target volume. Primary and secondary storage controllers may be used to control access to the primary and secondary storage devices.

A near instantaneous copy of a volume may be generated using a point-in-time snap copy function such as the IBM® FlashCopy function, for example. The point-in-time snap copy function creates a "snapshot" of the contents of a source volume as of a particular point-in-time in a target volume which may be referred to as the point-in-time snap copy volume. One version of a point-in-time snap copy function transfers the contents of the source volume to the point-in-time snap copy target volume in a background copy operation. Another version referred to as a "no background" version typically does not transfer the contents of the source volume to the point-in-time snap copy target volume unless an update operation to the source volume would overwrite data needed to complete the target volume.

The point-in-time snap copy function creates a snap copy relationship between a snap copy source and a snap copy target over a particular range of tracks. The snap copy relationship may be withdrawn terminating the snap copy relationship between the source and target, with respect to the entire range of the original snap copy relationship, or with respect to a subrange of tracks. If the withdrawal is directed to a subrange, the original snap copy relationship may be split into two or more snap copy relationships of subranges of the original snap copy relationship. Previously, a split snap copy relationship for the subrange which was the subject of the withdrawal request, was immediately withdrawn.

A local copy target bitmap having a bit for each track of the point-in-time snap copy volume, is used to indicate tracks which have not yet been transferred to the point-in-time snap copy volume. As the contents of each track of the source volume are copied to the target volume, the corresponding bit of the local copy target bitmap is updated (typically reset) to indicate successful transfer of the contents for the associated track. Any read operations directed to a track of the point-in-time snap copy volume which has not yet received the contents of the corresponding track of the source volume, are redirected to obtain the contents of that track from the source volume. Accordingly, the contents of a point-in-time snap copy volume are immediately available albeit indirectly, before any tracks have actually been transferred to the target volume. Conversely, if the host directs an update to a track of the source volume before the contents of that track have been transferred to the point-in-time snap copy volume, the contents of the track of the source volume are transferred to the point-in-time snap copy volume before the update is permitted to overwrite the contents of that track of the source volume.

To maintain a degree of consistency of data across multiple volumes at a secondary system, the IBM® Total Storage disk subsystem Peer-to-Peer Remote Copy (PPRC) function supports the concept of a PPRC consistency group. Volumes in a PPRC relationship that are configured into a PPRC Consistency Group are maintained to ensure that a group of updates made to volumes at the primary system are also eventually made on the volumes at the secondary system to maintain data consistency for those volumes of the group. Accordingly, consistency groups may be formed between volumes of the primary system and the secondary system which are consistent with respect to a particular set of updates or a particular point in time, notwithstanding the overall asynchronous relationship between the primary system and the secondary system.

SUMMARY

One general aspect of snap copy withdrawal management in accordance with the present description includes determining whether to delay withdrawal of a point-in-time snap copy relationship in response to a withdrawal request, to temporarily preserve data of the point-in-time snap copy relationship, to facilitate completion of a consistency group. In one embodiment, the snap copy withdrawal management in accordance with the present description includes establishing a first point-in-time snap copy relationship between a snap copy source and a snap copy target as of a first point-in-time over a first range of tracks of the snap copy source wherein the first range of tracks includes a first subrange of tracks and a second subrange of tracks, and receiving a withdraw request issued as of a second point-in-time to withdraw the first subrange of tracks from the point-in-time snap copy relationship. In response to the withdrawal request, a second point-in-time snap copy relationship is created between the snap copy source and the snap copy target as of the first point-in-time over the second subrange of tracks of the snap copy source, and the range of the first point-in-time snap copy relationship is reduced to the first subrange of tracks of the withdraw request to provide a modified first point-in-time snap copy relationship as of the first point-in-time between the snap copy source and the snap copy target over the first subrange of tracks of the withdraw request.

In one aspect, a determination is made as to whether to delay withdrawal of the modified first point-in-time snap copy relationship in response to the withdrawal request, to temporarily preserve data of the first subrange of tracks of the modified first point-in-time snap copy relationship. In one embodiment, the determining whether to delay withdrawal of the modified first point-in-time snap copy relationship includes determining whether a consistency group between a consistency group source and a consistency group target was initiated as of a third point-in-time which is both a) after the first point-in-time of the relationship establishing and b) before the second point-in-time of issuance of the withdraw request.

In another aspect, snap copy withdrawal management in accordance with the present description further includes withdrawing the modified first point-in-time snap copy relationship in response to the withdrawal request in the absence of a consistency group which was initiated both a) after the first point-in-time of the relationship establishing and b) before the second point-in-time of issuance of the withdraw request.

Yet another aspect is directed to delaying withdrawal of the modified first point-in-time snap copy relationship in response to the withdrawal request if it is determined that a first consistency group was initiated at a third point-in-time which is both a) after the first point-in-time of the relationship establishing and b) before the second point-in-time of issuance of the withdraw request. In another aspect of snap copy withdrawal management in accordance with the present description, the determining whether to delay withdrawal of the modified first point-in-time snap copy relationship further includes determining whether a second consistency group between a consistency group source and a consistency group target was initiated as of a fourth point-in-time which is after the second point-in-time of issuance of the withdraw request.

In still another aspect, snap copy withdrawal management in accordance with the present description further includes, if it is determined that a second consistency group between a consistency group source and a consistency group target, was initiated as of a fourth point-in-time which is after the second point-in-time of issuance of the withdraw request, determining if the data for completing the second consistency group is available. In yet another aspect, snap copy withdrawal management in accordance with the present description further includes, withdrawing the modified first point-in-time snap copy relationship in response to the withdrawal request if it is determined that the data for completing the second consistency group is available, and delaying withdrawal of the modified first point-in-time snap copy relationship in response to the withdrawal request if it is determined that the data for completing the second consistency group is not available.

Implementations of the described techniques may include hardware, a method or process, or computer software on a computer-accessible medium. Other features and aspects may be realized, depending upon the particular application.

DETAILED DESCRIPTION

Figure 1:
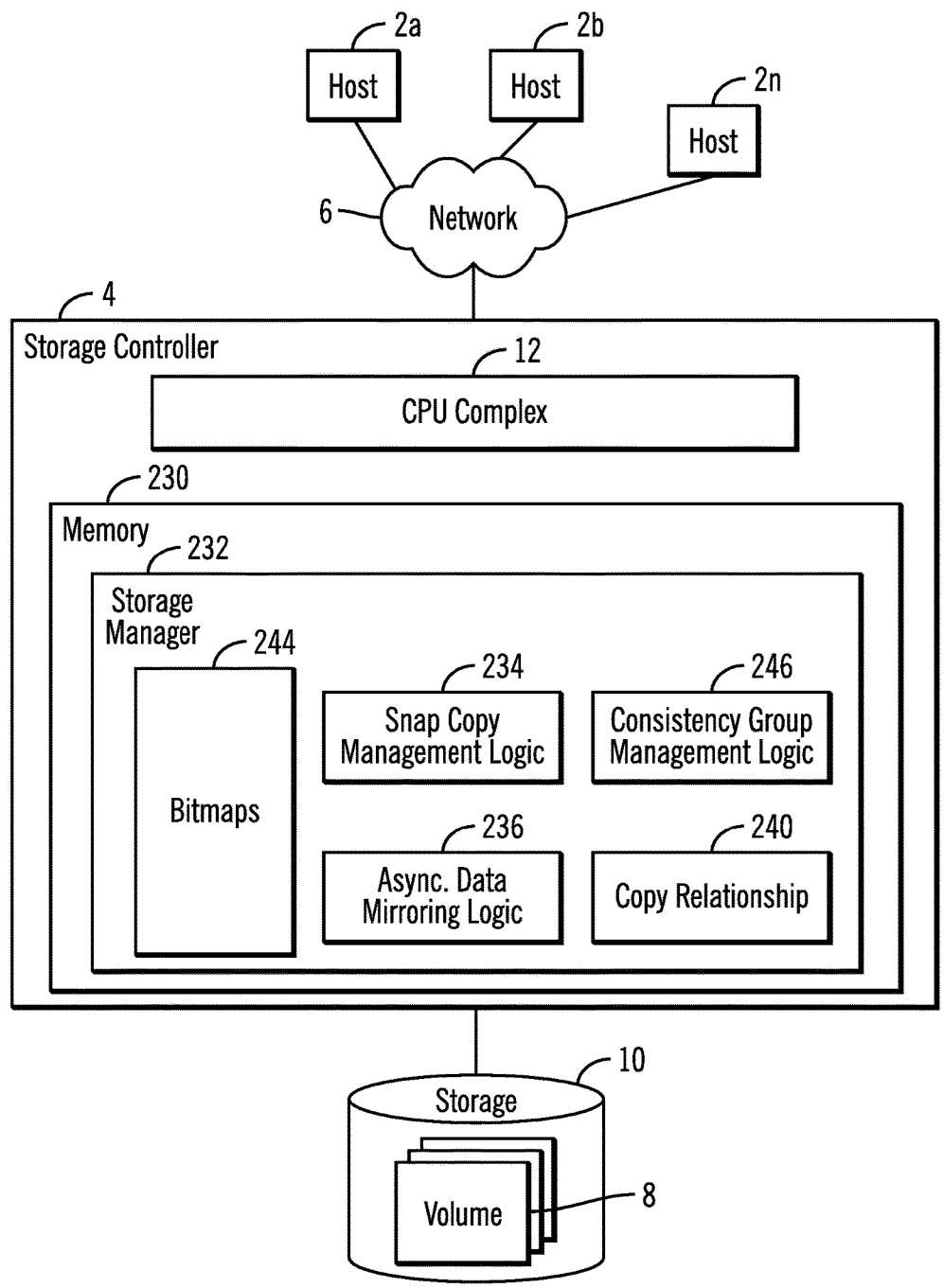
FIG. 1 illustrates an embodiment of a computing environment employing snap copy withdrawal management in accordance with one aspect of the present description.

A system of one or more computers may be configured for snap copy withdrawal management in accordance with the present description, by virtue of having software, firmware, hardware, or a combination of them installed on the system that in operation causes or cause the system to perform operations of copy on consistency group management. For example, one or more computer programs may be configured to perform snap copy withdrawal management by virtue of including instructions that, when executed by data processing apparatus, cause the apparatus to perform the actions.

It has been proposed that one of the volumes of the primary system which may be in a consistency group with volumes at the secondary system, may itself be a target of a point-in-time snap copy relationship as long as the point-in-time snap copy relationship has not been withdrawn and was initiated prior to formation of the consistency group such that the consistency group includes the target volume of the point-in-time snap copy relationship. Previously however, issuance of a withdraw request directed to a snap copy relationship typically resulted in immediate withdrawal of all or a portion of the snap copy relationship.

It is appreciated that absent snap copy withdrawal management operations in accordance with the present description, withdrawal of a point-in-time snap copy relationship in response to a withdrawal request prior to completion of a consistency group which includes the snap copy relationship, may disrupt completion of a consistency group. For example, data needed to complete a volume of a consistency group may be located only on the snap copy source. Hence, withdrawal of the point-in-time snap copy relationship before such data has been copied to a target which is part of a consistency group, may prevent completion of the consistency group.

One approach would be to forbid withdrawal of a point-in-time snap copy relationship having a target which is a primary of a consistency group until the transfer of data from the snap copy source to the snap copy target was complete, typically in a background copy operation. However, completion of the data transfer may be excessively time consuming, thereby impacting system performance at the host level. Moreover, it is appreciated herein that some or all of the data transfer may not be needed, thereby unnecessarily adversely affecting system performance at both the host and the storage controller level.

In one aspect of the present description, snap copy relationship withdrawal logic manages withdrawal of a point-in-time snap copy relationship or a portion of such a relationship, in a manner which can obviate disruption of consistency groups due to premature execution of the withdrawal request, and can improve system performance. In one example, a request to withdraw a snap copy relationship may be directed to the entire range of the relationship or may be directed to just a subrange of the relationship. If the withdrawal request is directed to a subrange of the original snap copy relationship, snap copy relationship splitting logic, in response to such a withdrawal request, may split the point-in-time in time snap copy relations by creating one or more point-in-time snap copy relationships over one or more subranges of tracks of the snap copy source.

For example, if the withdrawal request is directed to an intermediate subrange of the full range of the original snap copy relationship, the snap copy relationship is split into three snap copy relationships associated with three subranges, a top subrange, the intermediate withdrawal subrange of the withdrawal request, and a bottom subrange. Each of the three split snap copy relationships, will be as of the same particular point-in-time as that of the original snap copy relationship and will have the same data as the corresponding subranges of tracks of the original snap copy relationship.

In one embodiment, a withdrawal request may be issued by a host to a storage controller. In so far as the host is concerned, in one aspect of the present description, the withdrawal request may be immediately granted by the storage controller, thereby improving system performance. However with respect to the storage controller, withdrawal delay logic of the storage controller determines whether to delay actual execution of the withdrawal request to withdraw the point-in-time snap copy relationship with respect to a particular range of tracks, to temporarily preserve data of the range or subrange of tracks.

For example, the storage controller may be generating or maintaining a consistency group which includes a target volume of a snap copy relationship having a subrange which is the subject of the withdrawal request. If the withdrawal delay logic of the storage controller determines that the actual execution of the withdrawal request is to be delayed, in one embodiment, a background copy of data from the snap copy source to the snap copy target may be initiated for the subrange of the withdrawal request to preserve that data on the target volume so that it is available for completion of the consistency group, if needed.

However, it is appreciated herein that the consistency group which includes the snap copy relationship subject to the withdrawal request may be subsequently overwritten by another, later "hardened" consistency group which does not include the snap copy relationship of the withdrawal request. As used herein, the term "hardening" refers to a status of a consistency group in which all data needed to complete the volumes of the consistency group is available, either physically present in a volume of the consistency group or available in a snap copy source for a snap copy target which is a part of the consistency group, for example.

In another aspect of the present description, the background copy and the delay may both be terminated and the withdrawal request may be executed without further delay in the storage controller if the consistency group which may have previously relied upon source data of the consistency group has been superseded by a later, hardened consistency group which does not include the snap copy relationship of the withdrawal request. As a result, disruptions to completion of consistency groups may be avoided by selectively delaying the withdrawal of a snap copy relationship corresponding to the withdrawal subrange should it be determined by the withdrawal delay logic to delay withdrawal of the snap copy relationship corresponding to the withdrawal subrange of the withdrawal request. Moreover, system performance may be improved by early termination of the delay and executing the withdrawal request as soon as the data of the source of the snap copy relationship is no longer needed for a consistency group.

It is appreciated that some embodiments may not employ a background copy operation during a delay period. For example, execution of the withdrawal request may be delayed without background copy until the consistency group has been overwritten by a subsequent hardened consistency group which does not include the snap copy relationship which was the subject of the withdrawal request. Other features and aspects may be realized, depending upon the particular application.

In one embodiment, the local copying from the local copy source to the local copy target creates a point-in-time snap copy on the local primary source with no background copying. Thus, in an asynchronous data replication system, a point-in-time snap copy volume may be made of a primary volume at the primary system with respect to the contents of the primary volume as of a particular point-in-time. It is appreciated that snap copy withdrawal management in accordance with the present description may be applied to other types of copying, depending upon the particular application.

A system of one or more computers may be configured for snap copy withdrawal management in accordance with the present description, by virtue of having software, firmware, hardware, or a combination of them installed on the system that in operation causes or cause the system to perform snap copy withdrawal management operations. Also, the operations described herein are performed by logic which is configured to perform the operations either automatically or substantially automatically with little or no system operator intervention, except where indicated as being performed manually.

As used herein, the term "automatic" includes both fully automatic, that is operations performed by one or more hardware or software controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

Many of the functional elements described in this specification have been labeled as "logic," in order to more particularly emphasize their implementation independence. For example, a logic element may be implemented as a hardware circuit comprising custom VLSI circuits or gate arrays, off-the-shelf semiconductors such as logic chips, transistors, or other discrete components. A logic element may also be implemented in programmable hardware devices such as field programmable gate arrays, programmable array logic, programmable logic devices or the like.

A logic element may also be implemented in software for execution by various types of processors. A logic element which includes executable code may, for instance, comprise one or more physical or logical blocks of computer instructions which may, for instance, be organized as an object, procedure, or function. Nevertheless, the executables of an identified logic element need not be physically located together, but may comprise disparate instructions stored in different locations which, when joined logically together, comprise the logic element and achieve the stated purpose for the logic element.

Indeed, executable code for a logic element may be a single instruction, or many instructions, and may even be distributed over several different code segments, among different programs, among different processors, and across several memory devices. Similarly, operational data may be identified and illustrated herein within logic elements, and may be embodied in any suitable form and organized within any suitable type of data structure. The operational data may be collected as a single data set, or may be distributed over different locations including over different storage devices.

In the illustrated embodiment, a copy relationship identifies a source storage location, such as a primary storage location, and a target storage location, such as a another storage location, in which data stored at the source storage location is to be replicated or otherwise copied to the target storage location. Thus, as used herein, a source storage location and a target storage location are storage locations related by a copy relationship.

Furthermore, as used herein, the term "unit of storage" or "storage unit" refers to a storage location containing one or more units of data storage capable of storing one or more data units such as one or more volumes, cylinders, tracks, segments, extents, or any portion thereof, or other unit or units of data suitable for transfer. Thus, a source storage unit and the associated target storage unit may each be a storage volume. However, it is appreciated that a source storage unit and a target storage unit may each be of a size other than a volume, for example.

As used herein, the term "copying" includes actual copying in which data content of a source storage location is actually transferred to a target storage location. However, the term "copying" as used herein also includes virtual copying in which a data structure such as a bitmap is set to redirect read operations initially directed to a target storage location, to a source storage location instead of to the target storage location, and thus need not include actual transfer of the data content of a source storage location to a target storage location. Similarly, as used herein, the term "copy" includes an actual copy in which a target storage location contains the same data content as a source storage location but also includes a virtual copy in which a target storage location has an associated data structure such as a local copy target bitmap which has been set to redirect read operations initially directed to the target storage location, to the source storage location instead of the target storage location, such that a virtual copy need not include the actual data content of the source storage location.

Figure 2:
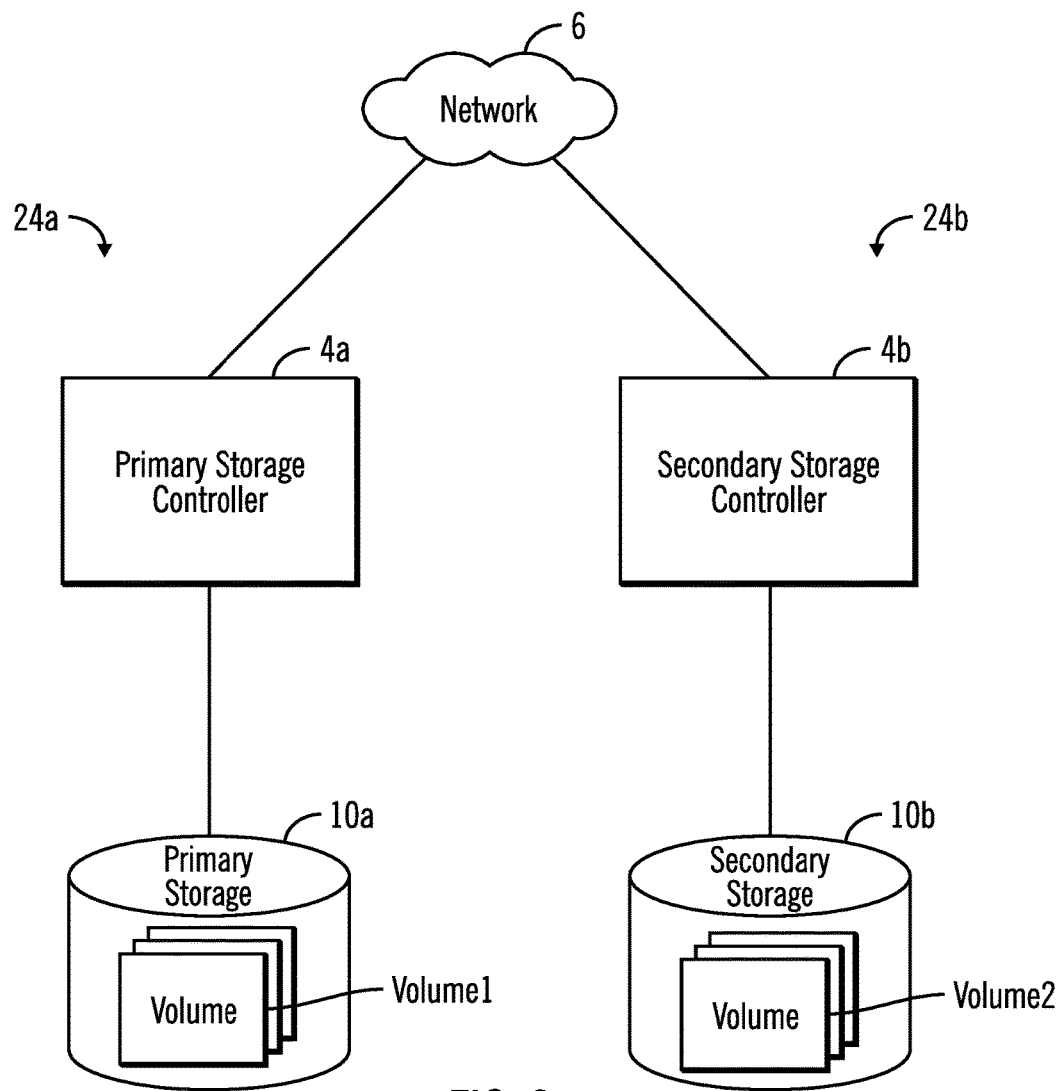
FIG. 2 illustrates an example of a storage system having a primary system and a secondary system employing snap copy withdrawal management in accordance with one aspect of the present description.

Implementations of the described techniques may include hardware, a method or process, or computer software on a computer-accessible medium. FIG. 1 illustrates an embodiment of a computing environment employing snap copy withdrawal management in accordance with the present description. A plurality of hosts 2a, 2b . . . 2n may submit Input/Output (I/O) requests to one or more storage controllers or storage control units 4, 4a (FIG. 2), 4b (FIG. 2) over a network 6 to access data at volumes 8 (e.g., Logical Unit Numbers, Logical Devices, Logical Subsystems, etc.) in storage represented by one or more storage drives 10, 10a, (FIG. 2), 10b (FIG. 2). Each storage controller 4, 4a, 4b includes a CPU complex 12 (FIG. 1), including one or more processors or central processing units, each having a single or multiple processor cores. In this embodiment, a processor core contains the components of a CPU involved in executing instructions, such as an arithmetic logic unit (ALU), floating point unit (FPU), and/or various levels of cache (such as L1 and L2 cache), for example. It is appreciated that a processor core may have other logic elements in addition to or instead of those mentioned herein.

In the configuration illustrated in FIG. 2, the storage controller 4a and the data storage 10a have been configured as a primary storage control unit and the primary storage, respectively, of a primary system 24a. Similarly, the storage controller 4b and its data storage 10b have been configured as a secondary storage control unit and a secondary storage, respectively, of a secondary system 24b. Hence, in the configuration depicted in FIG. 2, the storage controller 4a will be referred to as a primary storage controller or control unit 4a, and the data storage 10a will be referred to as a primary storage 10a. Similarly, the storage controller or control unit 4b will be referred to as a secondary storage controller or control unit 4b and the data storage 10b will be referred to as a secondary data storage 10b.

In a particular copy relationship, such as a mirror relationship, the source unit is often referred to as the primary and the target unit is often referred to as the secondary. Replication relationships are defined between storage units of the data storage 10a and 10b. Notwithstanding a reference to the data storage 10a as "primary" and the data storage 10b as "secondary," particular storage units of the data storage 10a and the storage 10b may play both a primary (or source role) and a target (or secondary role) depending upon the particular copy relationship.

Figure 3:
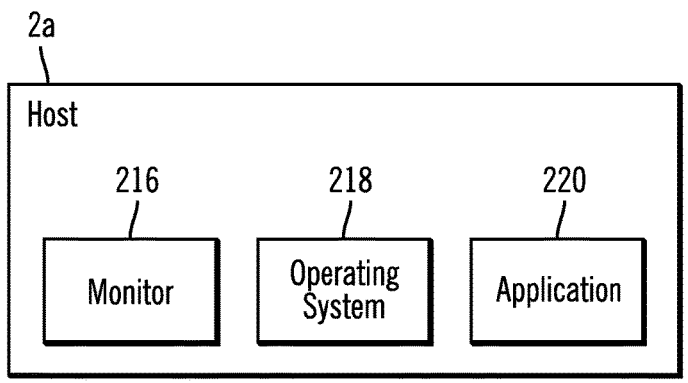
FIG. 3 illustrates an example of a host in the storage system of FIG. 1.

As noted above, the computing environment includes one or more hosts 2a, 2b, . . . 2n (FIG. 1) writing updates to the primary storage controller 4a (FIG. 2) for storage in the primary storage 10a. At least one such host such as the host 2a, has in this embodiment, storage management functions including a monitor program 216 (FIG. 3) to monitor failures in the availability of the primary storage controller 4a (FIG. 2) and its associated data storage 10a. In some embodiments, the monitor program 216 may be operated in a device apart from the hosts.

The primary storage controller 4a is located at a first site and the secondary storage controller 4b is located at a second site which may be geographically or functionally remote from the first site. Thus, in this example, the first site may be at a local site and the second site may be at geographically remote sites separated by a short or long geographical distance from the local site and from each other. Alternatively, the local and remote site may be relatively close such as in different buildings in the same general geographical location, in different rooms of the same building, in different machines in the same room, or in different portions or partitions of the same machine, of the network 6.

A typical host as represented by the host 2a (FIG. 3) includes an operating system 218 and an application 220 that reads data from and writes updates via a storage controller 4a, 4b to the primary storage 10a or secondary storage 10b. A host which includes the monitor program 216 may omit update writing applications 220 in some embodiments.

Figure 4:
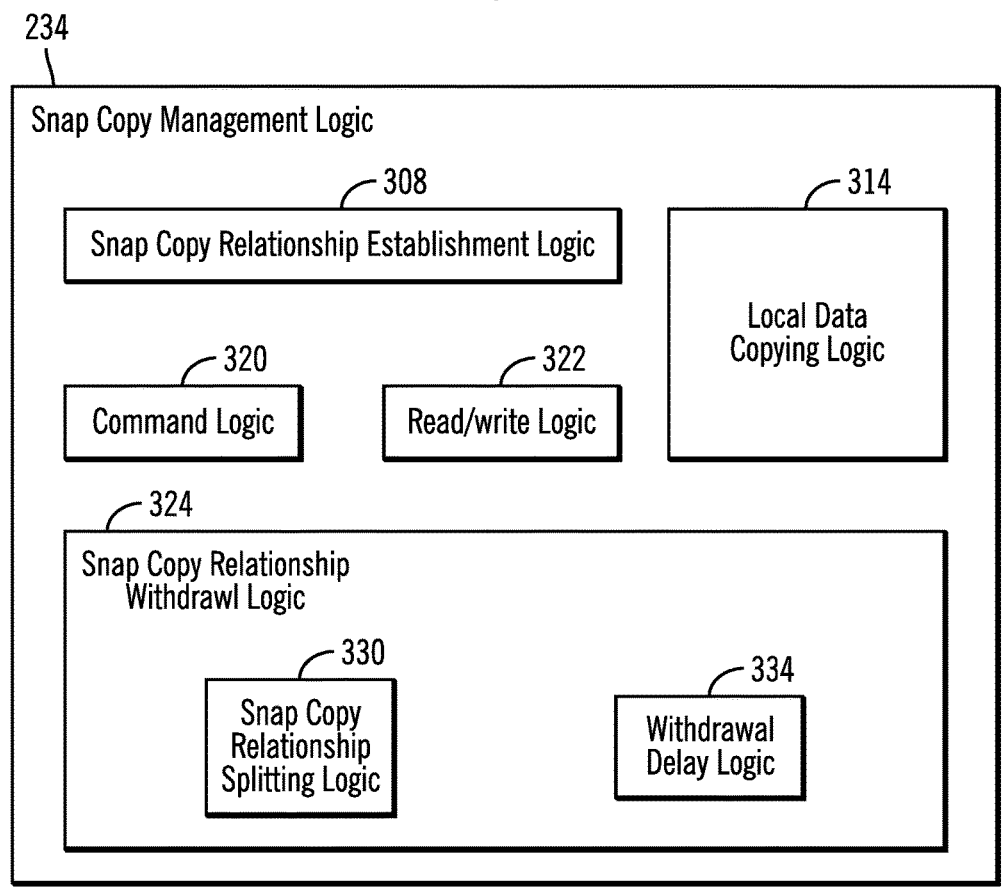
FIG. 4 illustrates an embodiment of snap copy management logic employing snap copy relationship withdrawal logic in accordance with one aspect of the present description.

Referring to FIGS. 1, 2, and 4, the storage controllers 4 (FIG. 1), 4a (FIG. 2), 4b each have a memory 230 (FIG. 1) that includes a storage manager 232 for managing storage operations including data replication operations from a primary volume1 of a primary system 24a to a secondary volume2 at a secondary system 24b, for example. A snap copy management logic 234 (which is described in greater detail in connection with FIG. 4) of the storage manager 232 is configured to in this embodiment, perform point-in-time snap copy operations in a consistency group of an asynchronous mirror relationship which includes the target volume of the primary volume1 of primary system. The pair of volumes of the consistency group are in an asynchronous copy relationship such that updates to the primary volume1 by a host, are asynchronously mirrored to the secondary volume2.

In the illustrated embodiment, the storage manager 232 including the snap copy management logic 234, is depicted as software stored in the memory 230 and executed by the CPU complex 12. However, it is appreciated that the logic functions of the storage manager 232 may be implemented as hardware, software, firmware or combinations of one or more thereof, depending upon the particular application.

The storage manager 232 further includes asynchronous data mirroring logic 236 configured to asynchronously mirror data from a local primary source such as a local primary volume1 (FIG. 2), for example, of a first storage unit such as the primary storage 10a (FIG. 2), for example, to a remote secondary target such as a remote secondary volume2 (FIG. 5), for example, of a second storage unit such as the secondary storage 10b, for example. One or more copy relationships 240, which may be maintained by the asynchronous data mirroring logic 236 for the primary and secondary storage controllers 4a, 4b (FIG. 2) associate primary storage locations in the primary storage 10a and corresponding secondary storage locations in the secondary storage 10b, such that updates by a host to the primary storage 10a locations are copied to the corresponding secondary storage 10b locations. For example, source storage locations in a primary storage volume1 (FIG. 2) of storage 10a may be mirrored in a mirror data replication operation to target storage locations of a secondary volume2 of the storage 10b pursuant to a mirror copy relationship 240 (FIG. 1).

In the illustrated embodiment, a copy relationship 240 comprises a peer-to-peer mirror relationship for a pair of storage locations in which updates to the primary (source) storage locations of the mirror relationship 240 are mirrored to the secondary (target) storage locations of the mirror relationship 240. It is appreciated that other types of copy relationships may be established, depending upon the particular application. For example, the copy relationships 240 may include point-in-time snap copy relationships or other local copying relationships maintained by the snap copy management logic 234.

In connection with a copy relationship 240 in an asynchronous data replication mode of the asynchronous data mirroring logic 236, updates to the primary storage locations of the primary storage 10a may be indicated in data structures such as a bitmap of a set of bitmaps 244, which is an out-of-sync (OOS) bitmap in the illustrated embodiment. Bits of the OOS bitmap are cleared as the storage manager 232 copies updates indicated in the OOS bitmap to the corresponding storage locations of the secondary storage 10b of secondary storage control unit 4b.

The storage manager 232 accesses updates to the primary storage 10a to write to the corresponding storage locations in the storage 10b. In some applications, the copying and relationship functions may be performed by devices external to the storage systems 24a, 24b (FIG. 2), such as the hosts, for example. In the illustrated embodiment, one copying relationship of the relationships 240 is a mirroring process in which each write update to the primary storage 10a is mirrored over to the secondary storage 10b. In the asynchronous mode of the illustrated embodiment, the I/O operation insofar as the host initiating the operation is concerned, is considered to be complete upon successful write of the update to the primary storage 10a. Accordingly, the host may be notified that the I/O operation was successfully completed notwithstanding that the update data has not yet been mirrored to the secondary storage 10b.

The storage manager 232 further includes consistency group management logic 246 which is configured to periodically form a consistency group of volumes in a relationship 240. The consistency group management logic 246 is configured to ensure that a group of updates made to volumes at the primary system are also eventually made on the volumes of the consistency group to maintain data consistency as of a particular point in time or a particular set of data for those volumes of the group. Accordingly, additional updates to an OOS bit map may be stopped at a particular point in time to form a consistency group between volumes of the primary system and the secondary system. Any unprocessed updates as indicated by the OOS bit map are transferred to the secondary storage so that the volumes of the consistency group are consistent as of the point in time at which updates were no longer added to the OOS bit map.

In contrast to the asynchronous mode, in a synchronous mode, an I/O operation which performed a write operation to the primary storage 10a is not considered complete until the mirror operation is completed, that is, it is not complete until the update data has been successfully replicated to the secondary storage 10b. Should the mirror operation fail such that the update is not successfully mirrored to the storage 10b, the host may be notified that the update operation was not successfully completed.

The storage manager 232 in one embodiment may transfer data from the primary storage 10a to the secondary storage 10b in tracks. As used herein, the term track may refer to a track of a disk storage unit but may also reference to other units of data (or data units) configured in the storage 10a, 10b, such as a bit, byte, word, segment, page, block (such as a Logical Block Address (LBA)), etc., which may be a part of a larger grouping of data units, such as those stored collectively as a volume, logical device, etc. of data.

In one embodiment, the storage devices 10a, 10b may be comprised of one or more sequential access storage devices, such as hard disk drives and magnetic tape or may include non-sequential access storage devices such as solid state drives (SSD), for example. Each storage device 10a, 10b may comprise a single sequential or non-sequential access storage device or may comprise an array of storage devices, such as a Just a Bunch of Disks (JBOD), Direct Access Storage Device (DASD), Redundant Array of Independent Disks (RAID) array, virtualization device, tape storage, flash memory, etc.

One mode of the snap copy management logic 234 managing the copy relationships, may be implemented with asynchronous copy operations, such as a peer-to-peer remote copy (PPRC) program modified as appropriate in accordance with present description. An example of a PPRC program is the IBM Tivoli Productivity Center for Replication copy program that enables the switching of updates from the primary storage 10a to the secondary storage 10b. Suitable asynchronous mirroring programs include XRC (or zGM) modified as appropriate in accordance with present description. The described operations may be implemented with other programs such as other copy programs or other global recovery programs modified as appropriate in accordance with present description.

The system components 2a, 2b . . . 2n, 4, 4a, 4b, 10, 10a, 10b are connected to the network 6 which enables communication among these components. Thus, the network 6 includes a fabric which may comprise a Storage Area Network (SAN), Local Area Network (LAN), Intranet, the Internet, Wide Area Network (WAN), peer-to-peer network, wireless network, arbitrated loop network, etc. Communication paths from the storage subsystems to the hosts 2a, 2b, 2n may be based upon a particular host attachment protocol such as Fibre Connection (FICON), for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

Communication software associated with the communication paths includes instructions and other software controlling communication protocols and the operation of the communication hardware in accordance with the communication protocols, if any. It is appreciated that other communication path protocols may be utilized, depending upon the particular application.

Figure 5:
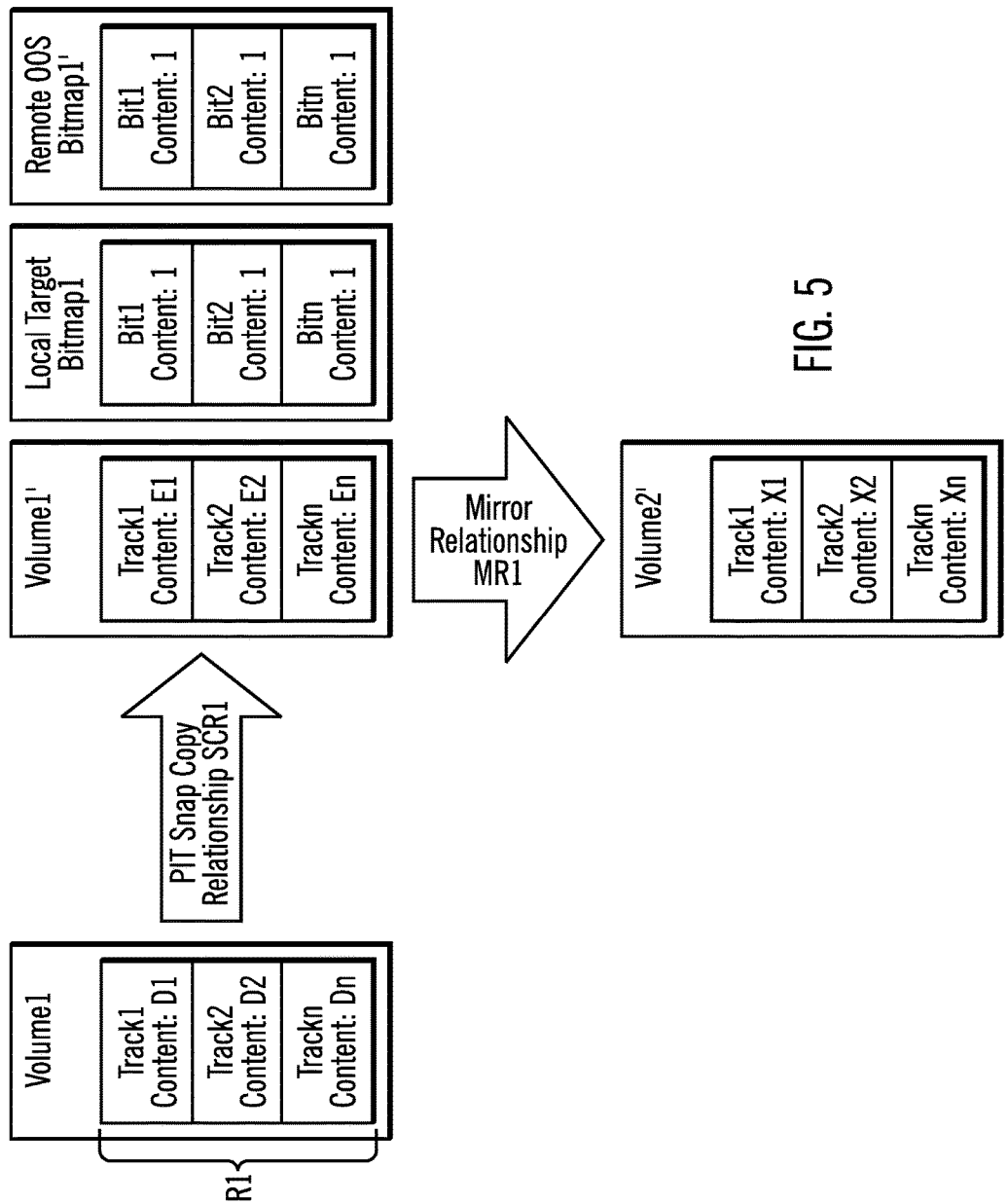
FIG. 5 depicts an examples of volumes, relationships and associated data structures in connection with of operations of the snap copy relationship withdrawal logic of FIG. 4.

The snap copy management logic 234 (FIG. 4) is configured to create a local copy, such as a point-in-time snap copy, for example, of a local copy source such as a primary volume, for example, to local copy target, which may also be utilized as a local primary source of a consistency group. Thus, in one example, the snap copy management logic 234 is configured to copy data of a local primary volume1 as of a particular point-in-time to a target such as the point-in-time snap copy target volume1' (FIG. 5) of the primary system 24a (FIG. 2) to provide a point-in-time snap copy of the primary volume1. In the example of FIG. 5, the copy relationship between the local primary volume1 and the point-in-time snap copy target volume1' is represented by an arrow labeled point-in-time (PIT) snap copy relationship SCR1.

Figure 6:
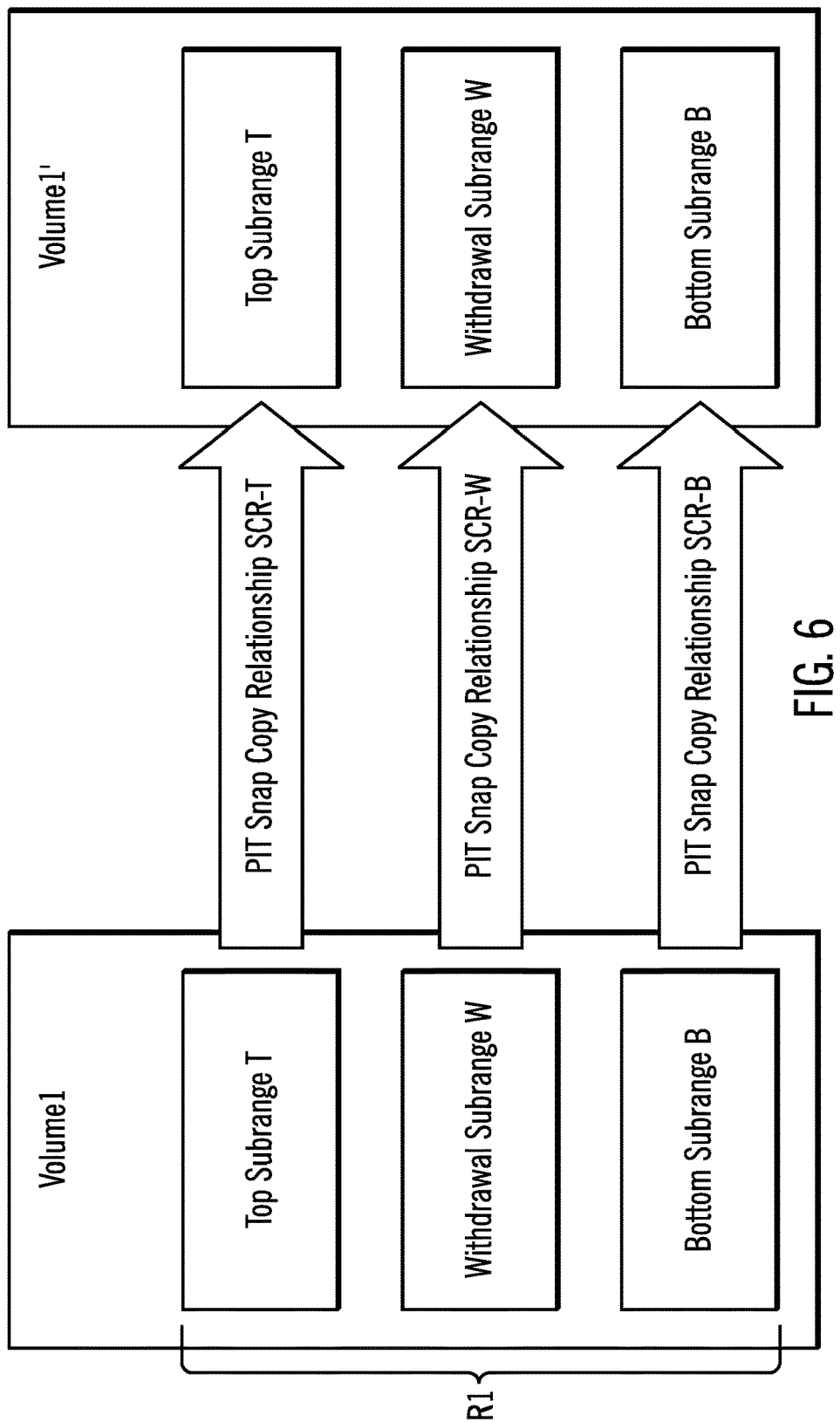
FIG. 6 depicts another example of operations of the snap copy relationship withdrawal logic of FIG. 4 including splitting a snap copy relationship in response to a withdrawal request.

The snap copy management logic 234 includes snap copy relationship establishment logic 308 (FIG. 4) which is configured to establish the point-in-time snap copy relationship SCR1 (FIG. 5) between the snap copy source volume1 and the snap copy target volume1' as of a particular point-in-time over a range R1 of tracks represented by the tracks, track1, track2 . . . trackn of the snap copy source volume1 wherein the range R1 of tracks includes subranges of tracks which in the example of FIG. 6 are a top subrange T (FIG. 6), an intermediate subrange W and a bottom subrange B. As explained in greater detail below, in one example of operations of the snap copy management logic 234, the intermediate subrange W will be the subject of a withdraw request to withdraw intermediate subrange W from the point-in-time snap copy relationship SCR1.

In the example of FIG. 5, the volume1' is both a point-in-time snap copy target volume1' of the point-in-time (PIT) snap copy relationship SCR1, and is also a local primary source volume1' of a mirror relationship MR1. Thus, a consistency group of volume1' and volume2' may be formed as of a particular point-in-time. Accordingly, volume1' may be referred to alternately as the point-in-time snap copy target volume1' of the point-in-time (PIT) snap copy relationship SCR1, or as the local primary source volume1' of the mirror relationship MR1 of the consistency group of volume1' and volume2', depending in some instances upon the particular role of the volume1' being discussed.

In one embodiment, to provide the first point-in-time snap copy of the local primary volume1 of the primary system 24a, a command logic 320 is configured to issue to the snap copy relationship establishment logic 308 of the snap copy management logic 234, a point-in-time snap copy command to establish the snap copy relationship SCR1 to generate the point-in-time snap copy target volume1' of data of the local primary volume1 as of the current point-in-time of the snap copy command. In response, the snap copy management logic 234 is further configured to copy data of the local primary volume1 as of the first point-in-time to the point-in-time snap copy target volume1' to provide the first point-in-time snap copy volume1' pursuant to the point-in-time snap copy relationship SCR1 which may be a background or no background type snap copy relationship.

In one embodiment, the snap copy relationship establishment logic 308 is further configured to, in executing the point-in-time snap copy command, generate a target bitmap of the bitmaps 244 (FIG. 1) such as the local copy target bitmap1 (FIG. 5), for example, indicating tracks which have not been copied from the local primary volume1 to the point-in-time snap copy target volume1' as of the particular first point-in-time. For example, the local copy target bitmap1 indicates by a set bit state (bit state 1 in this embodiment) of the bit1 of the bitmap1 that track1 of the local primary volume1 remains to be copied over to the point-in-time snap copy volume1'. Thus, the content of track1 of the point-in-time snap copy target volume1' as represented by the existing data value "E1" retains the existing data such that the source data D1 of the corresponding track1 of the local point-in-time source volume1 remains to be copied by the local to local copying to track1 of the point-in-time snap copy target volume1'. If the source data of the track1 of the local point-in-time source volume1 is copied over to the corresponding track1 of the point-in-time snap copy target volume1', the associated bit1 of the bitmap1 is reset (bit state 0 in this embodiment). Thus, a reset bit of the local copy target bitmap indicates that the associated track of the point-in-time snap copy target contains the copied source data of the point-in-time snap copy source. In this example, the local copy target bitmap1 indicates by the set bit state (bit state 1) of each of the remaining bits of the bitmap1 that each of the remaining tracks, track2 . . . trackn of the point-in-time snap copy source volume1 remain to be copied over to the point-in-time snap copy target volume1' in the example of FIG. 5. Thus, the local copy target bitmap1 indicates by the set bit state (bit state 1) of each of the remaining bits of the bitmap1 that each of the remaining tracks of the point-in-time snap copy target volume1' contain the existing data E2 . . . En of the point-in-time snap copy target volume1' instead of transferred source data from the point-in-time snap copy source volume1 in the example of FIG. 5.

In one embodiment, the point-in-time snap copy command which generates the point-in-time snap copy target volume1' may be of a "no background copy" type in which the source content of the local primary volume1 need not be transferred to the point-in-time snap copy target volume1' in a background copy operation. Instead, a read operation directed to a track of the point-in-time snap copy target volume1' may be redirected to the corresponding track of the local primary volume1 to obtain the source content of that track if the local copy target bitmap1 indicates by a bit state 1 that the source content for that track has not been transferred to the point-in-time snap copy volume1'. However, should a track of the primary volume1 be targeted for an update, the original source content of that track will be transferred to the corresponding track of the point-in-time snap copy target volume1' to overwrite the existing contents of that track and the local copy target bitmap1 will be updated to indicate that the source content of that track has been transferred.

In the example of FIG. 5, the volume1' is both a point-in-time snap copy target volume1' of the point-in-time (PIT) snap copy relationship SCR1, and is also a local primary source volume1' of a mirror relationship MR1. Accordingly, the asynchronous data mirroring logic 236 (FIG. 1) asynchronously mirrors data from the local primary volume1' (FIG. 5) of the primary storage 10a (FIG. 2), for example, to the remote secondary volume2' (FIG. 5) of the secondary storage 10b, for example. In the example of FIG. 5, the asynchronous mirroring of data from the local primary volume1' to the remote secondary volume2' is represented by an arrow labeled "mirror relationship MR1" in FIG. 5.

The local primary volume1' and the remote secondary volume2' of the mirror relationship MR1 may at a particular point-in-time be formed into a consistency group by the consistency group management logic 246 (FIG. 1). If so, as previously mentioned, the consistency group management logic 246 ensures that a group of updates made to volume1' at the primary system is also eventually made on the volume2' of the consistency group to maintain data consistency as of a particular point in time or a particular set of data for those volumes of the group.

Thus, in one embodiment, the asynchronous data mirroring logic 236 is configured to initiate a consistency group using asynchronous local to remote mirroring of data from a local primary source to a remote secondary target. The data mirroring logic 236 of the snap copy management logic 234 in mirroring data from the first data unit, such as a track, to the second data unit, is further configured to generate a first out-of-synch (OOS) bitmap1' of the bitmaps 244 (FIG. 1) such as the remote out-of-synch (OOS) bitmap1' (FIG. 5) indicating remaining tracks to be mirrored from the local primary volume1' to the secondary volume2'. For example, a reset bit state (bit state 0, in this example) of the bitmap1 would indicate that the associated track of the local primary volume1' has been successfully mirrored over to the secondary volume2'. In the example of FIG. 5, the tracks of the local primary volume1' have not yet been mirrored to the secondary volume2'.

Accordingly, the remote OOS bitmap1' indicates by the set bit state (bit state 1 in this example) of the bit1 of the OOS bitmap1' that track1 of the local primary volume1' remains to be mirrored over to the secondary volume2'. Thus, the content of track1 of the secondary volume2' as represented by the value "X1" is not the same as the content "E1" of track1 of the primary volume1'. Although the set and reset bit states are represented by the bit states 1 and 0, respectively, in the illustrated embodiment, it is appreciated that other bit values may be used to represent set and reset bit states. Accordingly, at the point-in-time depicted in FIG. 5, a consistency group of local primary volume1' and remote secondary volume2' would not have achieved consistency and therefore would not be complete.

It is appreciated that absent snap copy withdrawal management operations in accordance with the present description, withdrawal of the point-in-time snap copy relationship SCR1 prior to completion of the consistency group of local primary volume1' and remote secondary volume2' may disrupt completion of a consistency group. For example, data needed to complete a volume of a consistency group may be located only on the snap copy source volume1. Hence, withdrawal of the point-in-time snap copy relationship SCR1 before such data has been copied to the target volume1' which is part of a consistency group may prevent completion of a consistency group of volume1' and volume2'.

Figure 7:
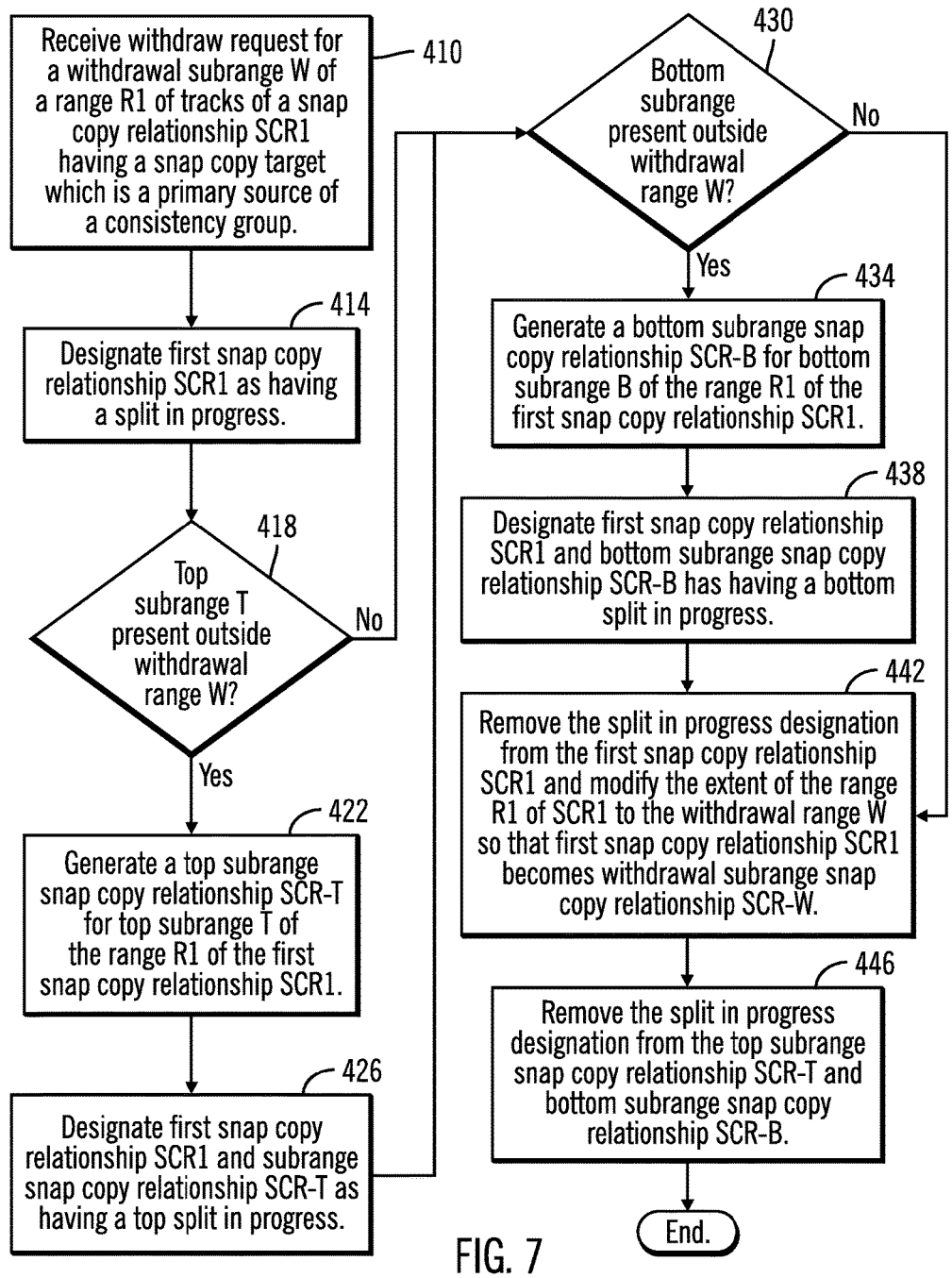
FIG. 7 depicts an example of operations of the snap copy relationship withdrawal logic of FIG. 4.

In one aspect of the present description, the snap copy management logic 234 (FIG. 4) includes in addition to the snap copy relationship establishment logic 308 described above, snap copy relationship withdrawal logic 324 configured to manage withdrawal of a point-in-time snap copy relationship or a portion of such a relationship, in a manner which can obviate disruption of consistency groups due to the withdrawal. A request to withdraw a snap copy relationship may be directed to the entire range of the relationship or may be directed to just a subrange of the relationship. In the example of FIGS. 6 and 7, a withdrawal request is directed to the intermediate subrange W (FIG. 6) of the range R1 of the point-in-time snap copy relationship SCR1 (FIG. 5).

Accordingly, the snap copy relationship withdrawal logic 324 (FIG. 4) is configured to receive a withdraw request issued as of a particular point-in-time to withdraw a subrange, such as the subrange W (FIG. 5) of the range R1 of tracks, for example) from a point-in-time snap copy relationship, such as the point-in-time snap copy relationship SCR1, for example. The snap copy relationship withdrawal logic 324 (FIG. 4) further includes snap copy relationship splitting logic 330 which is configured to, in response to a withdrawal request directed to a subrange of tracks of the point-in-time snap copy relationship, split the point-in-time in time snap copy relationship by creating one or more point-in-time snap copy relationships between the snap copy source and the snap copy target as of the original point-in-time over one or more subranges of tracks of the snap copy source. In the example of FIG. 6, because the withdrawal request is directed to an intermediate subrange W of the full range R1, the snap copy relationship SCR1 is split into three snap copy relationships associated with three subranges, a top subrange T, the intermediate withdrawal subrange W and a bottom subrange B. Each of the three split snap copy relationships, will be as of the same original point-in-time as that of the original snap copy relationship SCR1, and will have the same data as the corresponding subrange of tracks of the original snap copy relationship SCR1.

Thus, a second point-in-time snap copy relationship SCR-T has been created with respect to the top subrange T of the range R1 which is outside the withdrawal subrange W. Thus, the snap copy relationship SCR-T as indicated by the arrow so labeled, is a snap copy relationship from the top subrange T of the range R1 of tracks of the snap copy source volume1 to a corresponding top subrange T of the range R1 of tracks of the snap copy target volume1'.

In a similar manner, a third point-in-time snap copy relationship SCR-B has been created with respect to the bottom subrange B of the range R1 which is outside the withdrawal subrange W and the subrange T. Thus, the snap copy relationship SCR-B as represented by the arrow so labeled, is from the bottom subrange B of the range R1 of tracks of the snap copy source volume1 to a corresponding bottom subrange B of the range R1 of tracks of the snap copy target volume1'.

The snap copy relationship splitting logic 330 is further configured to reduce the range of the original point-in-time snap copy relationship to the withdrawal subrange of tracks of the withdraw request to provide a modified point-in-time snap copy relationship as of the same original point-in-time as the original snap copy relationship, from the snap copy source to the snap copy target over the withdrawal subrange of tracks of the withdraw request. Thus, in the example of FIG. 6, the snap copy relationship splitting logic 330 reduces the range of the original point-in-time snap copy relationship SCR1 to the withdrawal subrange W of tracks of the withdraw request to provide a modified point-in-time snap copy relationship SCR-W as indicated by the arrow in FIG. 6. The point-in-time snap copy relationship SCR-W is of the same original point-in-time as that of the original snap copy relationship SCR1 and provides a snap copy from the snap copy source, the subrange W of the snap copy source volume1 to the subrange W of the snap copy target volume1'. In this manner, the range of the original snap copy relationship SCR1 is reduced to that of withdrawal subrange W of tracks of the withdraw request.

As explained in greater detail below, the snap copy relationship withdrawal logic 324 further includes withdrawal delay logic 334 configured to determine whether to delay withdrawal of the modified point-in-time snap copy relationship in response to the withdrawal request, to temporarily preserve data of the subrange of tracks of the modified point-in-time snap copy relationship. As a result, disruptions to completion of consistency groups may be avoided by selectively delaying the withdrawal of the modified snap copy relationship corresponding to the withdrawal subrange W should it be determined by the withdrawal delay logic 334 to delay withdrawal of the snap copy relationship such as snap copy relationship SCR-W corresponding to the withdrawal subrange of the withdrawal request.

In the example of FIG. 6, the top subrange T, the intermediate withdrawal range W and the bottom range B total the full extent of the range R1 of the point-in-time snap copy relationship SCR1. It is appreciated that in other examples, if the withdrawal range is directed to a bottom subrange, for example, the snap copy relationship may be split into as few as two relationships for two subranges. Thus, a top subrange and a bottom withdrawal range may total the full extent of the range R1 of the point-in-time snap copy relationship SCR1. Similarly, if the withdrawal range is directed to a top subrange, a top withdrawal subrange and a bottom subrange may total the full extent of the range R1 of the point-in-time snap copy relationship SCR1. It is appreciated that the number of snap copy relationships into which an original snap copy relationship is split, may vary depending upon the particular application.

FIG. 7 depicts one example of the operations of the snap copy splitting logic 330 (FIG. 4) in connection with the snap copy relationships depicted in FIG. 6. Here too, it is appreciated that the number and manner of splitting snap copy relationships may vary, depending upon the particular application.

In one operation, a subrange withdraw request is received (block 410), requesting withdrawal of a withdrawal subrange W (FIG. 6) of the range R1 of tracks of the point-in-time snap copy relationship SCR1 having a snap copy target volume1' which may be a primary source of a consistency group of volume1' and remote secondary volume2' (FIG. 5). To initiate the overall splitting process, the snap copy splitting logic 330 (FIG. 4) designates (block 414) the snap copy relationship SCR1 as having an overall split in progress. Such a designation may be stored for example in a suitable data structure of the relationship SCR1 of the relationships 240 (FIG. 1). As a result of the designation, other modifications to the snap copy relationship SCR1 are held in abeyance until the overall splitting process is completed as described below.

A determination (block 418) is made by the snap copy splitting logic 330 (FIG. 4) as to whether the range R1 of the snap copy relationship SCR1 has a top subrange T which is outside withdrawal range W. In the example of FIG. 6, the range R1 of the snap copy relationship SCR1 does have a top subrange T which is outside withdrawal range W. As a result, the snap copy splitting logic 330 (FIG. 4) generates (block 422) a top subrange snap copy relationship SCR-T for top subrange T of the range R1 of the snap copy relationship SCR1 as shown in FIG. 6. In addition, both the snap copy relationship SCR1 and the subrange snap copy relationship SCR-T are designated (block 426) as having a top split in progress. As a result of the designation, other modifications to the snap copy relationship SCR1 and the snap copy relationship SCR-T are held in abeyance until the top splitting process is completed as described below. Such designations may be stored for example in a suitable data structure of the relationship SCR1 and the relationship SCR-T of the relationships 240 (FIG. 1).

A determination (block 430) is made by the snap copy splitting logic 330 (FIG. 4) as to whether the range R1 of the snap copy relationship SCR1 further has a bottom subrange B which is outside withdrawal range W. In the example of FIG. 6, the range R1 of the snap copy relationship SCR1 does have a bottom subrange B which is outside withdrawal range W. As a result, the snap copy splitting logic 330 (FIG. 4) generates (block 434) a bottom subrange snap copy relationship SCR-B for bottom subrange B of the range R1 of the first snap copy relationship SCR1. In addition, both the snap copy relationship SCR1 and the bottom subrange snap copy relationship SCR-B are designated (block 438) as having a bottom split in progress. As a result of the designation, other modifications to the snap copy relationship SCR1 and the snap copy relationship SCR-B are held in abeyance until the bottom splitting process is completed as described below. Such designations may be stored for example in a suitable data structure of the relationship SCR1 and the relationship SCR-B of the relationships 240 (FIG. 1).

In addition, the extent of the original snap copy relationship SCR1 is reduced (block 442) from the original range R1 to the withdrawal range W so that first snap copy relationship SCR1 becomes the smaller withdrawal subrange snap copy relationship of the withdrawal subrange W. In the example of FIG. 6, the snap copy relationship SCR1 once modified to the smaller withdrawal range W is redesignated the snap copy relationship SCR-W in FIG. 6 for clarity.

Upon completion of the splitting process as described above, the "split in progress" designation may be removed (block 442) from the snap copy relationship SCR1 redesignated snap copy relationship SCR-W. In addition, the "split in progress" designations may be removed (block 446) from the top subrange snap copy relationship SCR-T and the bottom subrange snap copy relationship SCR-B, respectively.

In the example of FIG. 6, upon completion of the splitting process, the withdrawal delay logic 334 of the snap copy relationship withdrawal logic 324, determines whether to delay withdrawal of the smaller snap copy relationship SCR-W of the withdrawal range W in response to the withdrawal request directed to the withdrawal range W. Delay of withdrawal of the snap copy relationship SCR-W may, for example, temporarily preserve data of the subrange W of tracks of the original snap copy relationship SCR1 to which the withdrawal request was directed. By doing so, disruptions to completion of consistency groups may be avoided.

Figure 8:
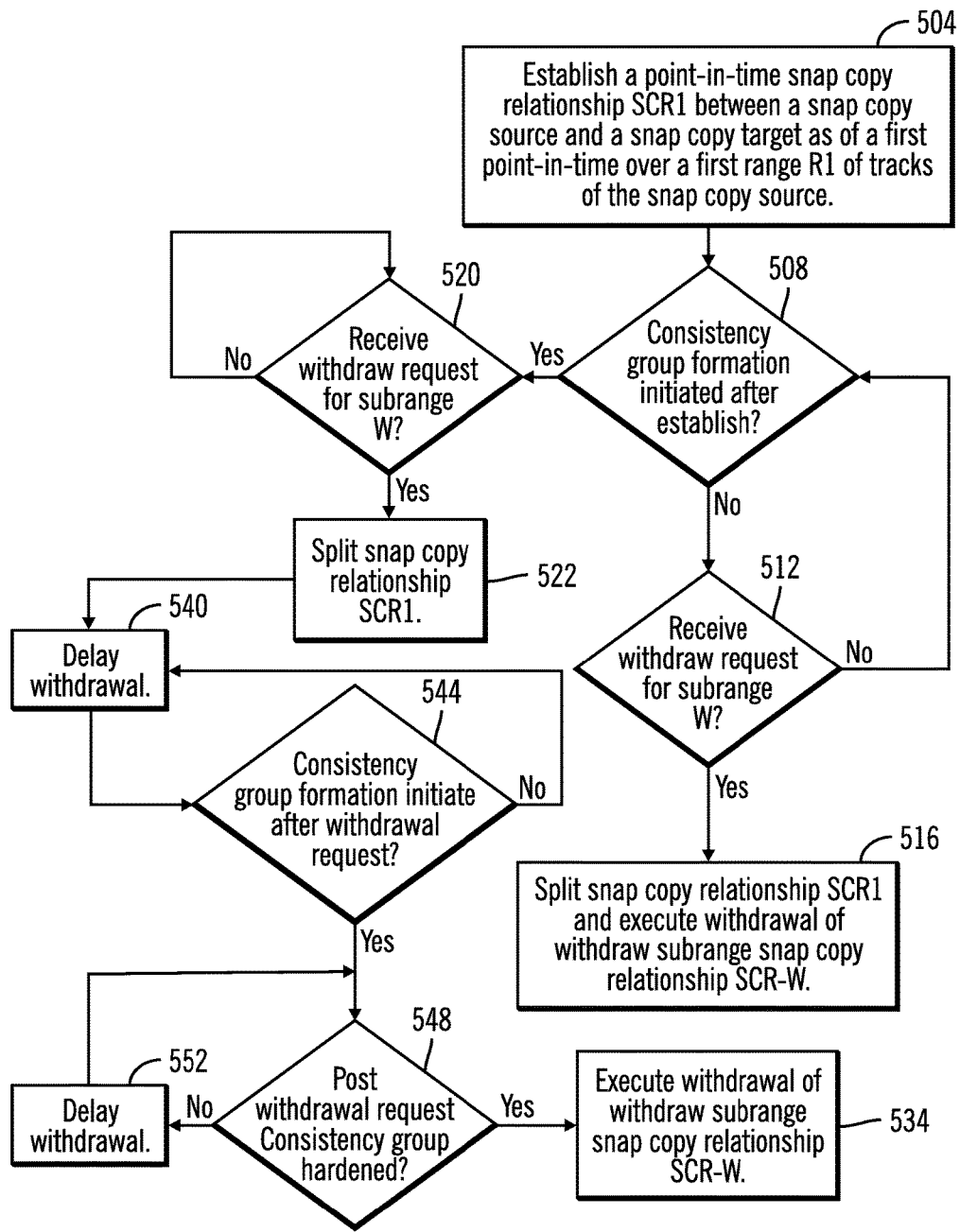
FIG. 8 depicts an example of operations of snap copy relationship withdrawal logic of FIG. 4 including delaying execution of a withdrawal request.

FIG. 8 depicts one example of the operations of the snap copy management logic 234 including operations of the withdrawal delay logic 334 in determining whether to delay withdrawal of the smaller snap copy relationship SCR-W of the withdrawal range W in response to the withdrawal request. Here too, it is appreciated that the manner of determining whether to delay withdrawal of a split snap copy relationship may vary, depending upon the particular application.

Figure 9A:
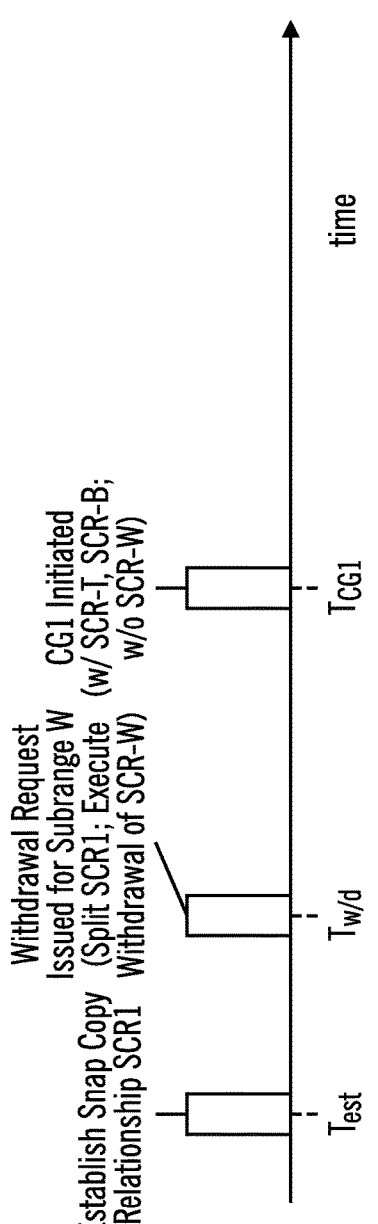
FIGS. 9A-9C depict examples of timelines of operations of snap copy relationship withdrawal logic of FIG. 4 in connection with consistency group formation and hardening examples.
Figure 9B:
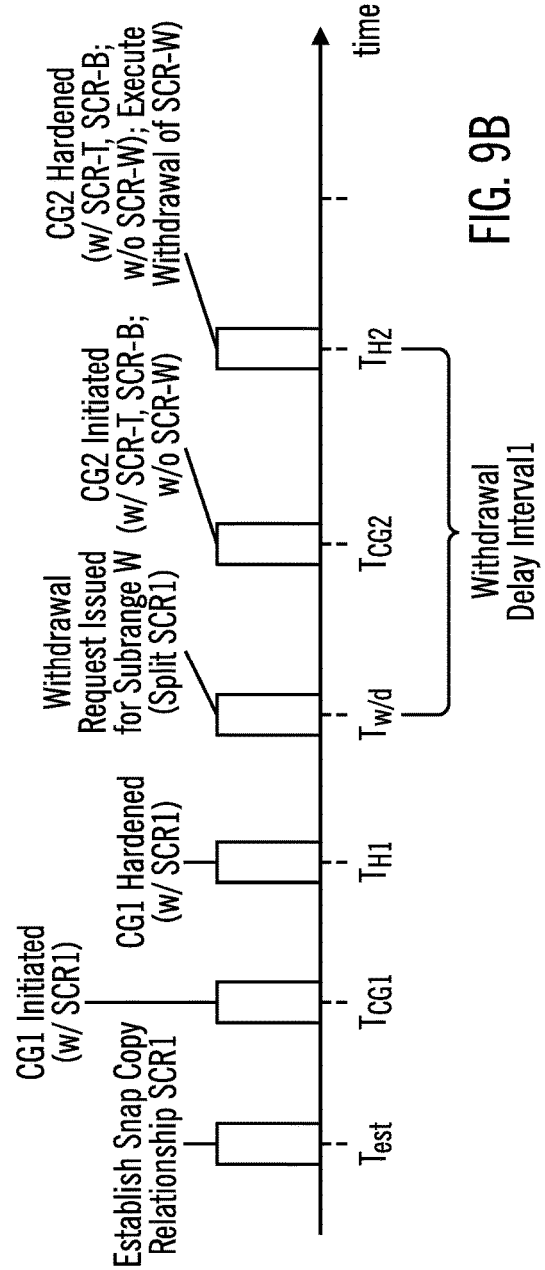
Figure 9C:
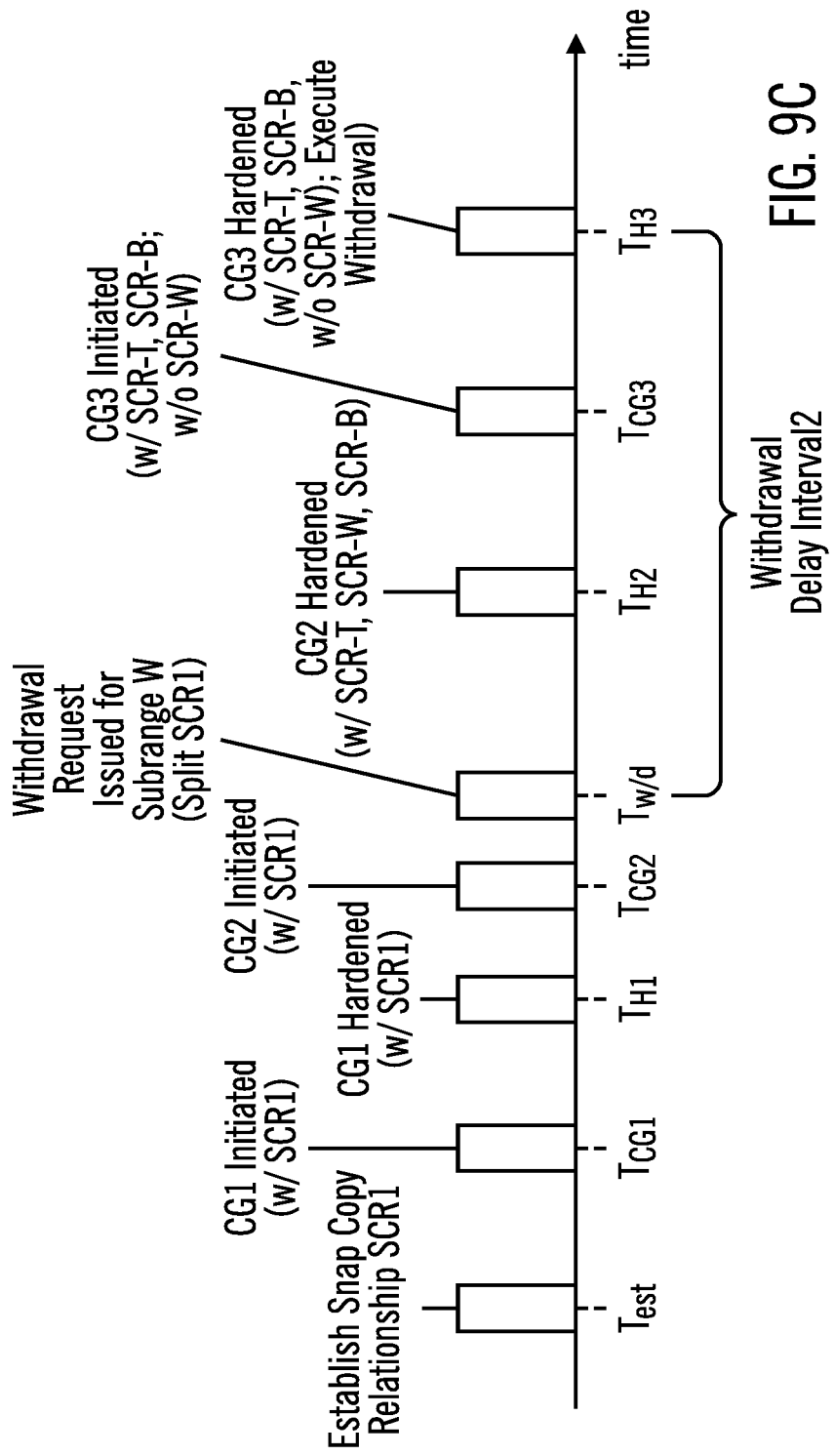

In one operation, the snap copy relationship establishment logic 308 (FIG. 4) establishes the point-in-time snap copy relationship SCR1 (FIG. 5) between the snap copy source volume1 and a snap copy target such as the volume1', as of a first point-in-time, $T_{est}$. FIGS. 9A-9C over the range R1 of tracks of the snap copy source volume1. FIGS. 9A-9C depict various time line scenarios of various points-in-time for snap copy relationship establishment at point-in-time $T_{est}$, withdrawal request issuance at point-in-time $T_{w/d}$, consistency group initiation at point-in-time $T_{CG}$, and consistency group "hardening" at point-in-time $T_H$. As previously mentioned, the term "hardening" refers to a status of a consistency group in which all data needed to complete the volumes of the consistency group are available, either physically present in a volume of the consistency group or available in a snap copy source for a snap copy target which is a part of the consistency group.

In one embodiment, the withdrawal delay logic 334 is further configured to determine whether a consistency group of a consistency group source and a consistency group target, was initiated by the consistency group management logic 246 (FIG. 1) as of a point-in-time which is both a) after the point-in-time of the relationship establishment and b) before the point-in-time of issuance of the withdraw request. Accordingly, the withdrawal delay logic 334 determines (block 508) whether a consistency group was initiated after the snap copy relationship was established, and if not, the withdrawal delay logic 334 determines (block 512) whether a withdrawal request was received directed to the subrange of the established snap copy relationship SCR1.

FIG. 9A shows an example in which the snap copy relationship SCR1 was established at point-in-time $T_{est}$ and a withdrawal request directed to subrange W was issued by a host, for example, at point-in-time $T_{w/d}$. A consistency group CG1 was initiated in the example of FIG. 9A after both the snap copy relationship SCR1 was established at point-in-time $T_{est}$ and the withdrawal request directed to subrange W was issued at point-in-time $T_{w/d}$. Accordingly, in the example of FIG. 9A, the withdrawal delay logic 334 determines (blocks 508, 512) that no consistency group was initiated in the interval following $T_{est}$, the point-in-time the snap copy relationship was established, and prior to $T_{w/d}$, the point-in-time the withdrawal request issued. Thus, the snap copy relationship SCR1 is not a part of any consistency group such as the consistency group CG1 which was initiated after $T_{w/d}$, the point-in-time the withdrawal request was issued for the snap copy relationship SCR1, nor is the snap copy relationship SCR1 a part of any consistency group which was initiated before $T_{est}$, the point-in-time the snap copy relationship was established.

Accordingly, in response to the received withdrawal request (block 512) directed to subrange W, the snap copy splitting logic 330 splits (block 516) the original snap copy relationship SR1 into three snap copy relationships SCR-T, SCR-W and SCR-B for the subranges T, W and B, respectively as described above in connection with FIGS. 6, 7. The withdrawal delay logic 334 is further configured to withdraw the snap copy relationship SCR-W modified from the original snap copy relationship SCR1) in response to the withdrawal request without significant delay since there was no consistency group which was initiated both a) after the point-in-time $T_{est}$ of the relationship establishment and b) before the point-in-time $T_{w/d}$ of issuance of the withdraw request. Thus, in the example of FIG. 9A, it was determined that no consistency group was initiated which included the original snap copy relationship SCR1. As a result, no data of the source copy of the snap copy relationship SCR-W is needed to complete the consistency group CG1 because it was initiated after the withdraw request such that the withdraw subrange snap copy relationship SCR-W is not a part of the consistency group CG1. As a result, execution of the withdrawal of the subrange snap copy relationship SCR-W may proceed (block 516) without delay since the data of the source copy of the snap copy relationship SCR-W is not needed to complete a consistency group such as the consistency group CG1. On the other hand, the top subrange snap copy relationship SCR-T and the bottom subrange snap copy relationship SCR-B which were not subject to the withdraw request, remain available to provide data if needed to complete hardening of the consistency group CG1.

FIG. 9B is directed to another example in which the consistency group CG1 is established at a point-in-time $T_{CG1}$ which is after the point-in-time $T_{est}$ that the original snap copy relationship SCR1 is established. The consistency group CG1 includes a volume such as the volume1' of the original snap copy relationship SCR1. As a result, the original snap copy relationship SCR1 is a part of the consistency group CG1 in the example of FIG. 9B.

Accordingly, in this example of FIG. 9B, the withdrawal delay logic 334 determines (block 508) that the consistency group CG1 was initiated at point-in-time $T_{CG1}$ after $T_{est}$, the point-in-time the snap copy relationship SCR1 was established. As a result, the withdrawal delay logic 334 determines (block 520) whether a withdrawal request was received directed to a subrange of the established snap copy relationship SCR1. If not, the withdrawal delay logic 334 is further configured to wait (block 520) until a withdrawal request is received.

In the example of FIG. 9B, in the interim period from the point-in-time $T_{CG1}$ in which the consistency group CG1 was initiated and the point-in-time $T_{w/d}$ in which a withdraw request directed to the snap copy relationship SCR1 was issued, the consistency group CG1 was hardened such that all data needed to complete the source and target volumes of the consistency group CG1 was available so long as the original snap copy relationship SCR1 is maintained. However, in the example of FIG. 9B, subsequent to hardening the consistency group CG1 at point-in-time $T_{H1}$, a withdrawal request directed to a subrange (subrange W) of the snap copy relationship SCR1 is issued at point-in-time $T_{w/d}$ in FIG. 9B.

In response to the received withdrawal request (block 520) directed to subrange W, the snap copy splitting logic 330 splits (block 522) the original snap copy relationship SR1 into three snap copy relationships SCR-T, SCR-W and SCR-B for the subranges T, W and B, respectively as described above in connection with FIGS. 6, 7. The withdrawal delay logic 334 is further configured to delay (block 540) withdrawal of the smaller point-in-time snap copy relationship SCR-W in response to the withdrawal request if it is determined (blocks 508, 520) that the consistency group CG1 was initiated at a point-in-time $T_{CG1}$ which is both a) after $T_{est}$, the point-in-time of establishment of the snap copy relationship SCR1 and b) before $T_{w/d}$, the point-in-time of issuance of the withdraw request. In the example of FIG. 9B, the consistency group CG1 was initiated at a point-in-time $T_{CG1}$ which is both a) after $T_{est}$, the point-in-time of establishment of the snap copy relationship SCR1 and b) before $T_{w/d}$, the point-in-time of issuance of the withdraw request. Accordingly, data of the source copy of the snap copy relationship SCR-W may be needed to complete the consistency group CG1. As a result, execution of the withdrawal of the subrange snap copy relationship SCR-W is delayed (block 540) for a withdrawal delay interval1 (FIG. 9B) as long the data of the source copy of the snap copy relationship SCR-W may be needed to complete the consistency group CG1.

In one embodiment, a withdrawal request may be issued by a host 2a (FIG. 1), for example, to a storage controller 4a, for example. In so far as the host is concerned, the withdrawal request may appear to the host to be immediately granted by the storage controller thereby improving performance of the host. However, the execution of the withdrawal request by the storage controller is actually delayed (block 540) as described above in this example.

In one embodiment, while the execution of the withdrawal request is delayed, a background copy of data from the snap copy source volume1 to the snap copy target volume1' may be initiated for the subrange W of the withdrawal request to preserve that data on the target volume1 in the subrange W so that it is available for completion of the consistency group CG1. It is appreciated that other embodiments may not initiate a background copy.

In another aspect of the present description, the withdrawal delay logic 334 is further configured to determine (block 544, FIG. 8) whether another consistency group was initiated by the consistency group management logic 246 (FIG. 2) as of a point-in-time which is after the point-in-time of issuance of the withdraw request. In the example of FIG. 9B another consistency group CG2 between a consistency group source and a consistency group target, is initiated at a point-in-time $T_{CG2}$ which is after $T_{w/d}$, the point-in-time of issuance of the withdraw request. Since the consistency group CG2 was initiated at a point-in-time $T_{CG2}$ which is after $T_{w/d}$, the point-in-time of issuance of the withdraw request, the snap copy relationship SCR-W is not part of the consistency group CG2. Thus, the snap copy target range W of the volume 1' (FIG. 5) is not a part of the consistency group CG2 and the data of the source range W of the volume1 is not needed to complete the consistency group CG2. However, it is appreciated herein that until the consistency group CG2 hardens and replaces the consistency group CG1, the snap copy target range W of the volume 1' (FIG. 5) remains a part of the consistency group CG1 and the data of the source range W of the volume1 may be needed to complete the consistency group CG1.

Accordingly, the withdrawal delay logic 334 is further configured to determine (block 548, FIG. 8) whether the second consistency group CG2 (which was initiated at a point-in-time $T_{CG2}$ which is after $T_{w/d}$, the point-in-time of issuance of the withdraw request) has been hardened, that is, whether all data needed to complete the consistency group CG2 is available. In the example of FIG. 9B, the second consistency group hardens at a point-in-time $T_{H2}$. In the illustrated embodiment, the consistency group management logic 246 (FIG. 2) replaces the earlier consistency group CG1 with the subsequent consistency group CG2 once CG2 has hardened. Because the earlier consistency group CG1 has been superseded by a later, hardened consistency group CG2 which does not rely upon the snap copy relationship SCR-W, the snap copy target range W of the volume 1' (FIG. 5) is no longer a part of a consistency group and the data of the source range W of the volume is not needed to complete a consistency group. Accordingly, the delay in executing the withdraw request may be terminated and the withdrawal of the snap copy relationship SCR-W may be executed. Accordingly, if a background copy had been initiated at the start of the delay interval1 but not yet completed by the time the hardened consistency group CG2 replaces the consistency group CG1, the background copy operation may be aborted since the data is no longer needed to complete consistency group CG1. In this manner, performance of the storage controller may be improved as well.

Accordingly, the withdrawal delay logic 334 is further configured to withdraw (block 534, FIG. 8) the snap copy relationship SCR-W modified from the original snap copy relationship SCR1, in response to the hardening (block 548, FIG. 8) at point-in-time $T_{H2}$ of the later consistency group CG2 which was initiated (block 504) both a) after the point-in-time $T_{est}$ of the establishment of the original relationship SCR1 and b) after the point-in-time $T_{w/d}$ of issuance of the withdraw request. Conversely, if it is determined (block 548, FIG. 8) that the second consistency group CG2 (which was initiated at a point-in-time $T_{CG2}$ which is after $T_{w/d}$, the point-in-time of issuance of the withdraw request)

has not yet been hardened, that is, all data needed to complete the consistency group CG2 may not be available, the withdrawal delay logic 334 is configured to continue to delay (block 552, FIG. 8) execution of the withdraw request in the withdrawal delay interval1 (FIG. 9B) until it is determined (block 548) that the second consistency group has hardened, that is, that all data needed to complete the consistency group CG2 is available. If so, as described above, the hardened consistency group CG2 replaces the earlier consistency group CG1. Because the hardened consistency group CG2 does not rely upon the snap copy relationship SCR-W, the delay (block 552) in executing the withdraw request may be terminated and the withdrawal (block 534) of the snap copy relationship SCR-W may be executed. Thus, the withdrawal delay interval1 (FIG. 9B) which was initiated at $T_{w/d}$, the point-in-time the withdraw request was initiated, is terminated at $T_{H2}$, the point-in-time in which the superseding consistency group CG2 was hardened. On the other hand, the top subrange snap copy relationship SCR-T and the bottom subrange snap copy relationship SCR-B which were not subject to the withdraw request, remain available to provide data if needed to complete hardening of the consistency group CG2.

FIG. 9C is directed to another example in which the consistency group CG1 is established at a point-in-time $T_{CG1}$ which is after the point-in-time $T_{est}$, that the original snap copy relationship SCR1 is established. The consistency group CG1 includes a volume such as the volume1' of the original snap copy relationship SCR1. As a result, the original snap copy relationship SCR1 is a part of the consistency group CG1 in the example of FIG. 9B.

Accordingly, in this example of FIG. 9C, the withdrawal delay logic 334 determines (block 508) that the consistency group CG1 was initiated at point-in-time $T_{CG1}$ after $T_{est}$, the point-in-time the snap copy relationship SCR1 was established. As a result, the withdrawal delay logic 334 determines (block 520) whether a withdrawal request was received directed to a subrange of the established snap copy relationship SCR1. If not, the withdrawal delay logic 334 is further configured to wait (block 520) until a withdrawal request is received.

In the example of FIG. 9C, in the interim period from the point-in-time $T_{CG1}$ in which the consistency group CG1 was initiated and the point-in-time $T_{w/d}$ in which a withdraw request directed to the snap copy relationship SCR1 was issued, the consistency group CG1 was hardened such that all data needed to complete the source and target volumes of the consistency group CG1 is available so long as the original snap copy relationship SCR1 is maintained. However, in the example of FIG. 9C, subsequent to hardening the consistency group CG1 at point-in-time $T_{H1}$, a second consistency group CG2 is established at a point-in-time $T_{CG2}$ which is also after the point-in-time $T_{est}$, that the original snap copy relationship SCR1 is established, and before the point-in-time $T_{w/d}$ in which a withdrawal request directed to the snap copy relationship SCR1 was issued. Thus, the consistency group CG2 also includes a volume such as the volume1' of the original snap copy relationship SCR1. As a result, the original snap copy relationship SCR1 is also a part of the consistency group CG2 in the example of FIG. 9C.

The withdrawal delay logic 334 determines (block 520) whether a withdrawal request was received directed to a subrange of the established snap copy relationship SCR1. If not, the withdrawal delay logic 334 is further configured to wait (block 520) until a withdrawal request is received. In the example of FIG. 9C, a withdrawal request directed to a subrange (subrange W) of the snap copy relationship SCR1 is issued at point-in-time $T_{w/d}$ in FIG. 9C. In response to the received withdrawal request (block 520) directed to subrange W, the snap copy splitting logic 330 splits (block 522) the original snap copy relationship SR1 into three snap copy relationships SCR-T, SCR-W and SCR-B for the subranges T, W and B, respectively as described above in connection with FIGS. 6, 7. The withdrawal delay logic 334 is further configured to delay (block 540) withdrawal of the smaller point-in-time snap copy relationship SCR-W in response to the withdrawal request if it is determined (blocks 508, 520) that the consistency groups CG1 and CG2 were initiated at a points-in-time $T_{CG1}$, $T_{CG2}$, respectively, which are both a) after $T_{est}$, the point-in-time of establishment of the snap copy relationship SCR1 and b) before $T_{w/d}$, the point-in-time of issuance of the withdraw request. In the example of FIG. 9C, both the consistency groups CG1, CG2 were initiated at a points-in-time $T_{CG1}$, $T_{CG2}$, respectively, which are both a) after $T_{est}$, the point-in-time of establishment of the snap copy relationship SCR1 and b) before $T_{w/d}$, the point-in-time of issuance of the withdraw request. Accordingly, data of the source copy of the snap copy relationship SCR-W may be needed to complete both the consistency group CG1 and the consistency group CG2. As a result, execution of the withdrawal of the subrange snap copy relationship SCR-W is delayed (block 540) for a withdrawal delay interval2 (FIG. 9B) as long the data of the source copy of the snap copy relationship SCR-W may be needed to complete the consistency groups CG1 and CG2.

In one embodiment, while the execution of the withdrawal request is delayed, a background copy of data from the snap copy source volume1 to the snap copy target volume1' may be initiated for the subrange W of the withdrawal request to preserve that data on the target volume1 in the subrange W so that it is available for completion of the consistency groups CG1 and CG2. It is appreciated that other embodiments may not initiate a background copy.

In the example of FIG. 9C, the second consistency group CG2 hardens at the point-in-time $T_{H2}$, subsequent to the issuance of the withdrawal request at point-in-time $T_{w/d}$. As a result, the hardened consistency group CG2 supersedes the earlier consistency group CG1 and the data of the source copy of the snap copy relationship SCR-W is no longer needed to complete the superseded consistency group CG1. However, the successor consistency group CG2 may continue to need the data of the source copy of the snap copy relationship SCR-W to complete the consistency group CG2.

In another aspect of the present description, the withdrawal delay logic 334 is further configured to determine (block 544, FIG. 8) whether yet another consistency group was initiated by the consistency group management logic 246 (FIG. 2) as of a point-in-time which is after $T_{w/d}$, the point-in-time of issuance of the withdrawal request. In the example of FIG. 9C yet another consistency group CG3 is initiated at a point-in-time $T_{CG3}$ which is after $T_{w/d}$, the point-in-time of issuance of the withdrawal request. Since the consistency group CG3 was initiated at a point-in-time $T_{CG3}$ which is after $T_{w/d}$, the point-in-time of issuance of the withdraw request, the snap copy relationship SCR-W is not part of the consistency group CG3. Thus, the snap copy target range W of the volume 1' (FIG. 5) is not a part of the consistency group CG3 and the data of the source range W of the volume 1 is not needed to complete the consistency group CG3. However, it is appreciated herein that until the consistency group CG3 hardens and replaces the consistency group CG2, the snap copy target range W of the volume 1'

(FIG. 5) remains a part of the consistency group CG2 and the data of the source range W of the volume 1 may be needed to complete the consistency group CG2.

Accordingly, the withdrawal delay logic 334 is further configured to determine (block 548, FIG. 8) whether the third consistency group CG3 (which was initiated at a point-in-time $T_{CG3}$ which is after $T_{w/d}$, the point-in-time of issuance of the withdraw request) has been hardened, that is, whether all data needed to complete the consistency group CG3 is available. In the example of FIG. 9C, the third consistency group hardens at a point-in-time $T_{H3}$. In the illustrated embodiment of FIG. 9C, the consistency group management logic 246 (FIG. 2) replaces the earlier consistency group CG2 with the subsequent consistency group CG3 once CG3 has hardened. Because the earlier consistency group CG2 has been superseded by a later, hardened consistency group CG3 which does not rely upon the snap copy relationship SCR-W, the snap copy target range W of the volume 1' (FIG. 5) is no longer a part of a consistency group and the data of the source range W of the volume is not needed to complete a consistency group. Accordingly, the delay in executing the withdraw request may be terminated and the withdrawal of the snap copy relationship SCR-W may be executed.

Accordingly, the withdrawal delay logic 334 is further configured to withdraw (block 534, FIG. 8) the snap copy relationship SCR-W modified from the original snap copy relationship SCR1, in response to the hardening (block 548, FIG. 8) at point-in-time $T_{H3}$ of the later consistency group CG3 which was initiated (block 504) both a) after the point-in-time $T_{est}$ of the establishment of the original relationship SCR1 and b) after the point-in-time $T_{w/d}$ of issuance of the withdraw request. Conversely, if it is determined (block 548, FIG. 8) that the third consistency group CG3 (which was initiated at a point-in-time $T_{CG3}$ which is after $T_{w/d}$, the point-in-time of issuance of the withdraw request) has not yet been hardened, that is, all data needed to complete the consistency group CG2 may not be available, the withdrawal delay logic 334 is configured to continue to delay (block 552, FIG. 8) execution of the withdrawal request in the withdrawal delay interval2 (FIG. 9B) until it is determined (block 548) that the second consistency group has hardened, that is, that all data needed to complete the consistency group CG3 is available. If so, as described above, the hardened consistency group CG3 replaces the earlier consistency group CG2. Because the hardened consistency group CG3 does not rely upon the snap copy relationship SCR-W, the delay (block 552) in executing the withdrawal request may be terminated and the withdrawal (block 534) of the snap copy relationship SCR-W may be executed. Thus, the withdrawal delay interval2 (FIG. 9B) which was initiated at $T_{w/d}$, the point-in-time the withdraw request was initiated, is terminated at $T_{H3}$, the point-in-time in which the superseding consistency group CG3 was hardened. If a background copy had been initiated at the start of the delay interval2 but not yet completed by the time the hardened consistency group CG3 replaces the consistency group CG2, the background copy operation may be aborted since the data is no longer needed to complete consistency group CG2. On the other hand, the top subrange snap copy relationship SCR-T and the bottom subrange snap copy relationship SCR-B which were not subject to the withdraw request, remain available to provide data if needed to complete hardening of the consistency group CG3.

It is appreciated that in other embodiments, the point-in-time snap copy command which generates the point-in-time snap copy target volume1' may a "background copy" type in which the content of the local primary volume1 is transferred in a background copy operation to the point-in-time snap copy volume1'. As the content of each track of the primary volume is transferred in a background copy to the content of the corresponding track of the point-in-time snap copy volume1', the bit state of the bit representing that track in the local copy target bitmap1 may be updated to a bit state value "0" to indicate that the track has been transferred to the point-in-time snap copy volume1'.

Figure 10:
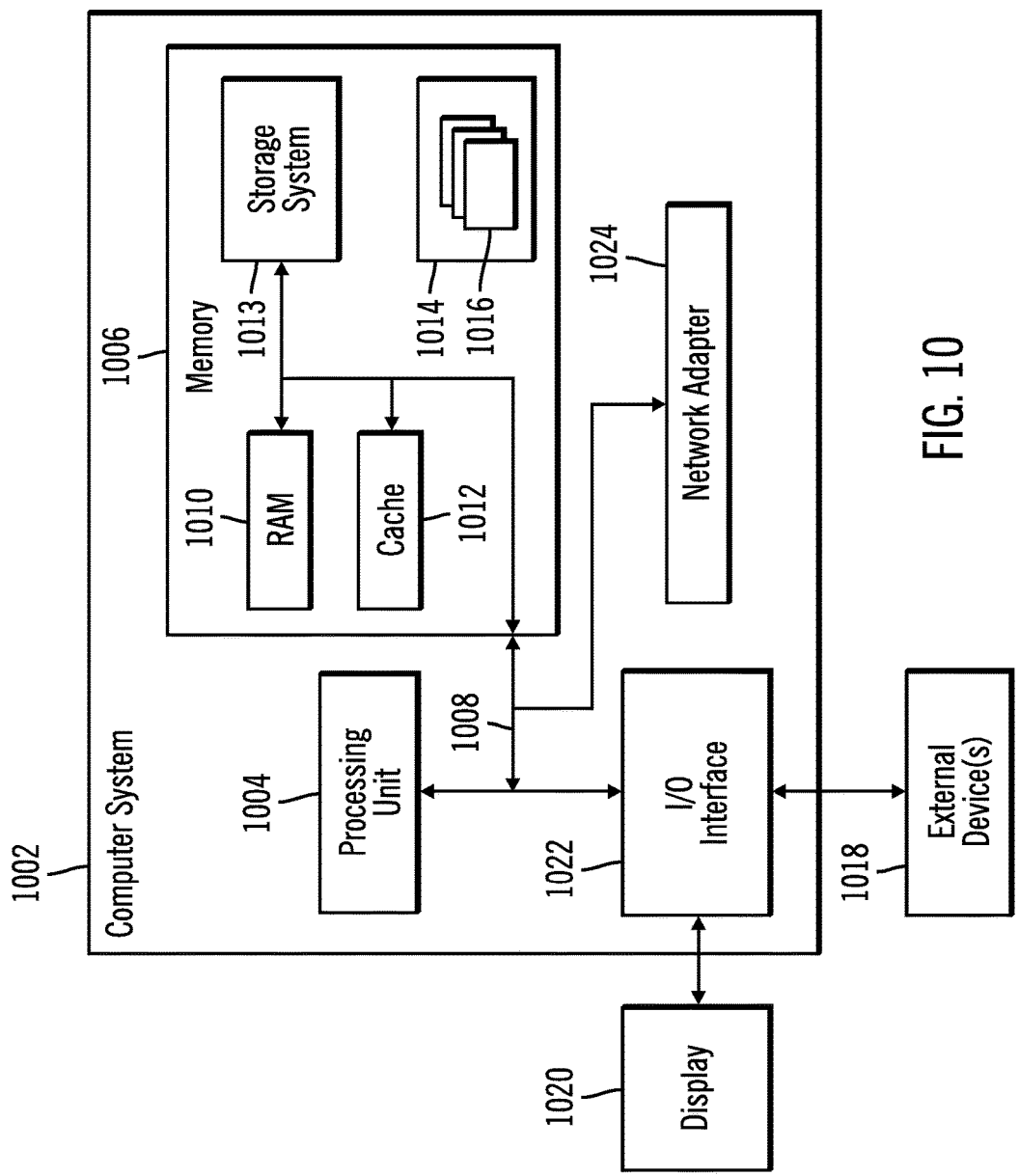
FIG. 10 illustrates another computer embodiment employing snap copy withdrawal management in accordance with the present description.

The computational components of the figures may each be implemented in one or more computer systems, such as the computer system 1002 shown in FIG. 10. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer 1002 may be implemented as program modules 1016 which generally carry out the functions and/or methodologies of embodiments of the invention as described herein. The system of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method, comprising:
    establishing a first point-in-time snap copy relationship between a snap copy source and a snap copy target as of a first point-in-time over a first range of tracks of the snap copy source wherein the first range of tracks includes a first subrange of tracks and a second subrange of tracks;
    receiving a withdraw request issued as of a second point-in-time to withdraw the first subrange of tracks from the point-in-time snap copy relationship;
    creating a second point-in-time snap copy relationship between the snap copy source and the snap copy target as of the first point-in-time over the second subrange of tracks of the snap copy source;
    reducing the range of the first point-in-time snap copy relationship to the first subrange of tracks of the withdraw request to provide a modified first point-in-time snap copy relationship as of the first point-in-time between the snap copy source and the snap copy target over the first subrange of tracks of the withdraw request; and
    determining whether to delay withdrawal of the modified first point-in-time snap copy relationship in response to the withdrawal request, to temporarily preserve data of the first subrange of tracks of the modified first point-in-time snap copy relationship.

2. The method of claim 1 further wherein the determining whether to delay withdrawal of the modified first point-in-time snap copy relationship includes determining whether a consistency group between a consistency group source and a consistency group target was initiated as of a third point-in-time which is both a) after the first point-in-time of the relationship establishing and b) before the second point-in-time of issuance of the withdraw request.

3. The method of claim 2 further comprising withdrawing the modified first point-in-time snap copy relationship in response to the withdrawal request in the absence of a consistency group which was initiated both a) after the first point-in-time of the relationship establishing and b) before the second point-in-time of issuance of the withdraw request.

4. The method of claim 2 further comprising delaying withdrawal of the modified first point-in-time snap copy relationship in response to the withdrawal request if it is determined that a first consistency group was initiated at a third point-in-time which is both a) after the first point-intime of the relationship establishing and b) before the second point-in-time of issuance of the withdraw request.

5. The method of claim 4 wherein the determining whether to delay withdrawal of the modified first point-in-time snap copy relationship further includes determining whether a second consistency group between a consistency group source and a consistency group target was initiated as of a fourth point-in-time which is after the second point-in-time of issuance of the withdraw request.

6. The method of claim 5 further comprising if it is determined that a second consistency group between a consistency group source and a consistency group target, was initiated as of a fourth point-in-time which is after the second point-in-time of issuance of the withdraw request, determining if the data for completing the second consistency group is available.

7. The method of claim 6 further comprising withdrawing the modified first point-in-time snap copy relationship in response to the withdrawal request if it is determined that the data for completing the second consistency group is available, and delaying withdrawal of the modified first point-in-time snap copy relationship in response to the withdrawal request if it is determined that the data for completing the second consistency group is not available.

8. A storage controller, comprising:
snap copy relationship establishment logic configured to establish a first point-in-time snap copy relationship between a snap copy source and a snap copy target as of a first point-in-time over a first range of tracks of the snap copy source wherein the first range of tracks includes a first subrange of tracks and a second subrange of tracks;
snap copy relationship withdrawal logic configured to receive a withdraw request issued as of a second point-in-time to withdraw the first subrange of tracks from the point-in-time snap copy relationship, the snap copy relationship withdrawal logic having:
snap copy relationship splitting logic configured to create a second point-in-time snap copy relationship between the snap copy source and the snap copy target as of the first point-in-time over the second subrange of tracks of the snap copy source and reduce the range of the first point-in-time snap copy relationship to the first subrange of tracks of the withdraw request to provide a modified first point-in-time snap copy relationship as of the first point-in-time between the snap copy source and the snap copy target over the first subrange of tracks of the withdraw request; and
withdrawal delay logic configured to determine whether to delay withdrawal of the modified first point-in-time snap copy relationship in response to the withdrawal request, to temporarily preserve data of the first subrange of tracks of the modified first point-in-time snap copy relationship.

9. The storage controller of claim 8 further wherein the withdrawal delay logic is further configured to determine whether a consistency group between a consistency group source and a consistency group target was initiated as of a third point-in-time which is both a) after the first point-in-time of the relationship establishment and b) before the second point-in-time of issuance of the withdraw request.

10. The storage controller of claim 9 wherein the snap copy relationship withdrawal logic is further configured to withdraw the modified first point-in-time snap copy relationship in response to the withdrawal request in the absence of a consistency group which was initiated both a) after the first point-in-time of the relationship establishment and b) after the second point-in-time of issuance of the withdraw request.

11. The storage controller of claim 9 wherein the withdrawal delay logic is further configured to delay withdrawal of the modified first point-in-time snap copy relationship in response to the withdrawal request if it is determined that a first consistency group was initiated at a third point-in-time which is both a) after the first point-in-time of the relationship establishment and b) before the second point-in-time of issuance of the withdraw request.

12. The storage controller of claim 11 wherein the withdrawal delay logic is further configured to determine whether a second consistency group between a consistency group source and a consistency group target was initiated as of a fourth point-in-time which is after the second point-in-time of issuance of the withdraw request.

13. The storage controller of claim 12 wherein the withdrawal delay logic is further configured to, if it is determined that a second consistency group between a consistency group source and a consistency group target, was initiated as of a fourth point-in-time which is after the second point-in-time of issuance of the withdraw request, to determine if the data for completing the second consistency group is available.

14. The storage controller of claim 13 wherein the snap copy relationship withdrawal logic is further configured to withdraw the modified first point-in-time snap copy relationship in response to the withdrawal request if it is determined that the second consistency group has completed, and wherein the withdrawal delay logic is further configured to delay withdrawal of the modified first point-in-time snap copy relationship in response to the withdrawal request if it is determined that the data for completing the second consistency group is not available.

15. A computer program product for use with a host and a primary storage system at a first location, the primary storage system having a primary storage controller and at least one storage unit controlled by the primary storage controller and configured to store a plurality of data units in tracks, wherein the computer program product comprises a computer readable storage medium having program instructions embodied therewith, the program instructions executable by a processor a storage system to cause processor operations, the processor operations comprising:
establishing a first point-in-time snap copy relationship between a snap copy source of a storage unit and a snap copy target of a storage unit as of a first point-in-time over a first range of tracks of the snap copy source wherein the first range of tracks includes a first subrange of tracks and a second subrange of tracks;
receiving a withdraw request issued as of a second point-in-time to withdraw the first subrange of tracks from the point-in-time snap copy relationship;
creating a second point-in-time snap copy relationship between the snap copy source and the snap copy target as of the first point-in-time over the second subrange of tracks of the snap copy source;
reducing the range of the first point-in-time snap copy relationship to the first subrange of tracks of the withdraw request to provide a modified first point-in-time snap copy relationship as of the first point-in-time between the snap copy source and the snap copy target over the first subrange of tracks of the withdraw request; and
determining whether to delay withdrawal of the modified first point-in-time snap copy relationship in response to the withdrawal request, to temporarily preserve data of the first subrange of tracks of the modified first point-in-time snap copy relationship.

16. The computer program product of claim 15 further wherein the determining whether to delay withdrawal of the modified first point-in-time snap copy relationship includes determining whether a consistency group between a consistency group source and a consistency group target was initiated as of a third point-in-time which is both a) after the first point-in-time of the relationship establishing and b) before the second point-in-time of issuance of the withdraw request.

17. The computer program product of claim 16 wherein the operations further comprise withdrawing the modified first point-in-time snap copy relationship in response to the withdrawal request in the absence of a consistency group which was initiated both a) after the first point-in-time of the relationship establishing and b) before the second point-in-time of issuance of the withdraw request.

18. The computer program product of claim 16 wherein the operations further comprise delaying withdrawal of the modified first point-in-time snap copy relationship in response to the withdrawal request if it is determined that a first consistency group was initiated at a third point-in-time which is both a) after the first point-in-time of the relationship establishing and b) before the second point-in-time of issuance of the withdraw request.

19. The computer program product of claim 18 wherein the determining whether to delay withdrawal of the modified first point-in-time snap copy relationship further includes determining whether a second consistency group between a consistency group source and a consistency group target was initiated as of a fourth point-in-time which is after the second point-in-time of issuance of the withdraw request.

20. The computer program product of claim 19 wherein the operations further comprise if it is determined that a second consistency group between a consistency group source and a consistency group target, was initiated as of a fourth point-in-time which is after the second point-in-time of issuance of the withdraw request, determining if the data for completing the second consistency group is available.

21. The computer program product of claim 20 wherein the operations further comprise withdrawing the modified first point-in-time snap copy relationship in response to the withdrawal request if it is determined that the data for completing the second consistency group is available, and delaying withdrawal of the modified first point-in-time snap copy relationship in response to the withdrawal request if it is determined that the data for completing the second consistency group is not available.

* * * * *